May 18, 1943.   E. H. PRIEBE   2,319,515
POWER TRANSMISSION
Filed March 10, 1941   9 Sheets-Sheet 1
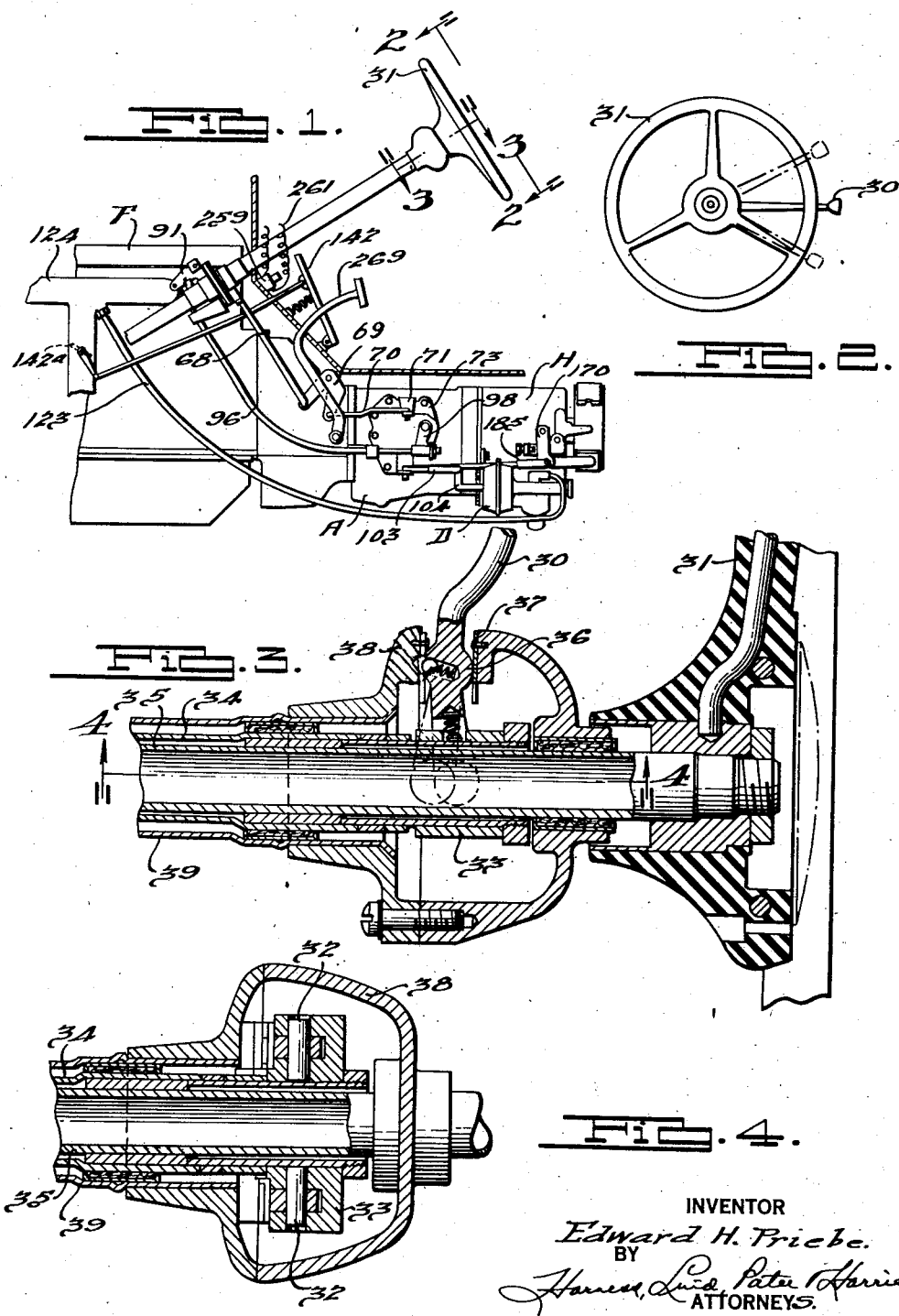
INVENTOR
Edward H. Priebe.
BY
ATTORNEYS.

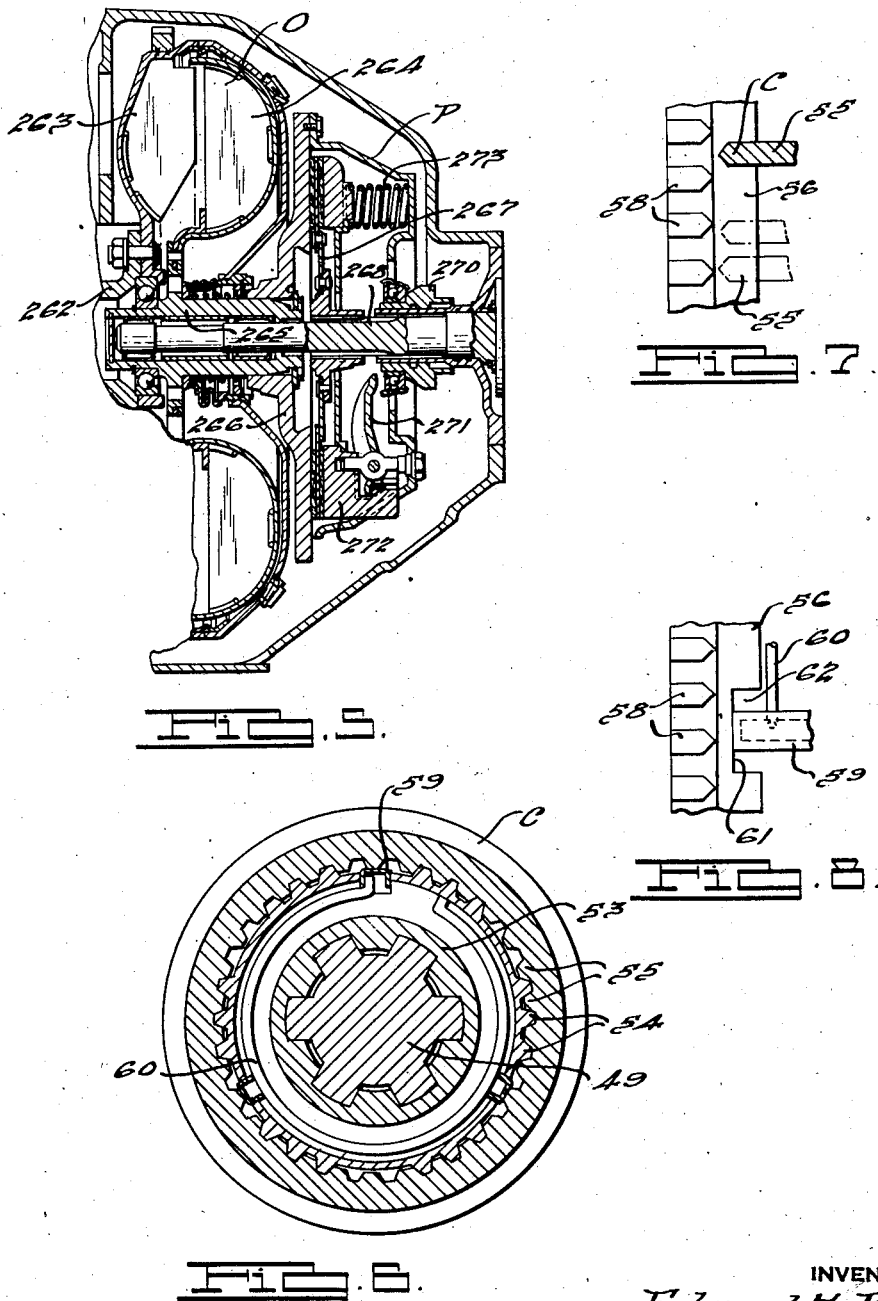

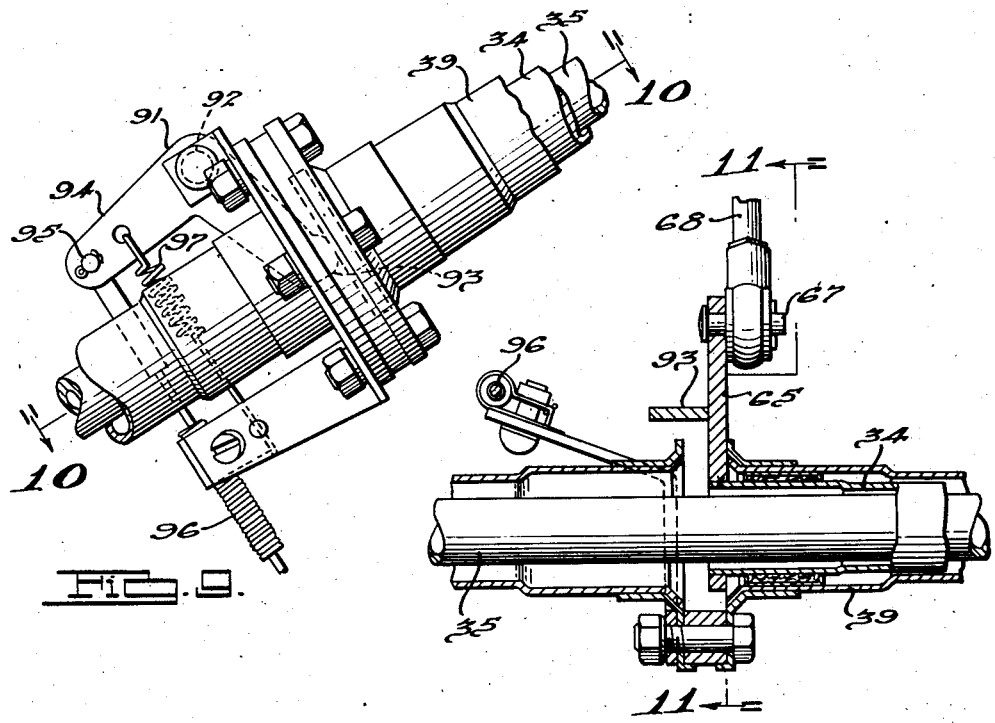
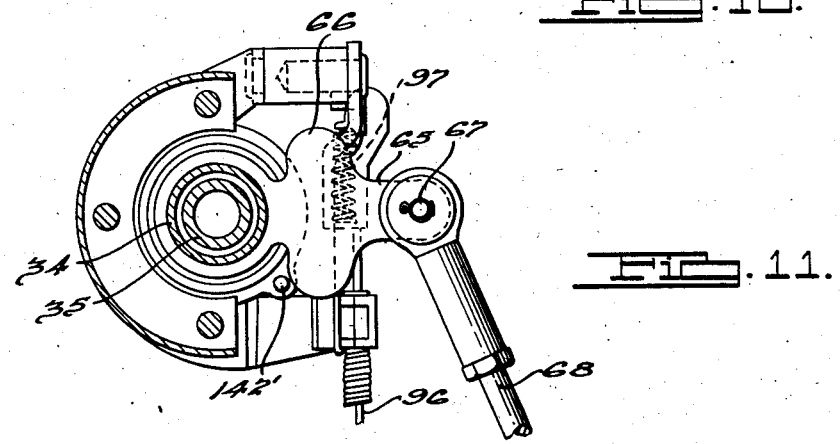

May 18, 1943.  E. H. PRIEBE  2,319,515
POWER TRANSMISSION
Filed March 10, 1941  9 Sheets-Sheet 5

INVENTOR
Edward H. Priebe.
BY
ATTORNEYS.

May 18, 1943    E. H. PRIEBE    2,319,515
POWER TRANSMISSION
Filed March 10, 1941    9 Sheets-Sheet 7

INVENTOR
Edward H. Priebe
BY
Harness, Lind, Pater Harris
ATTORNEYS

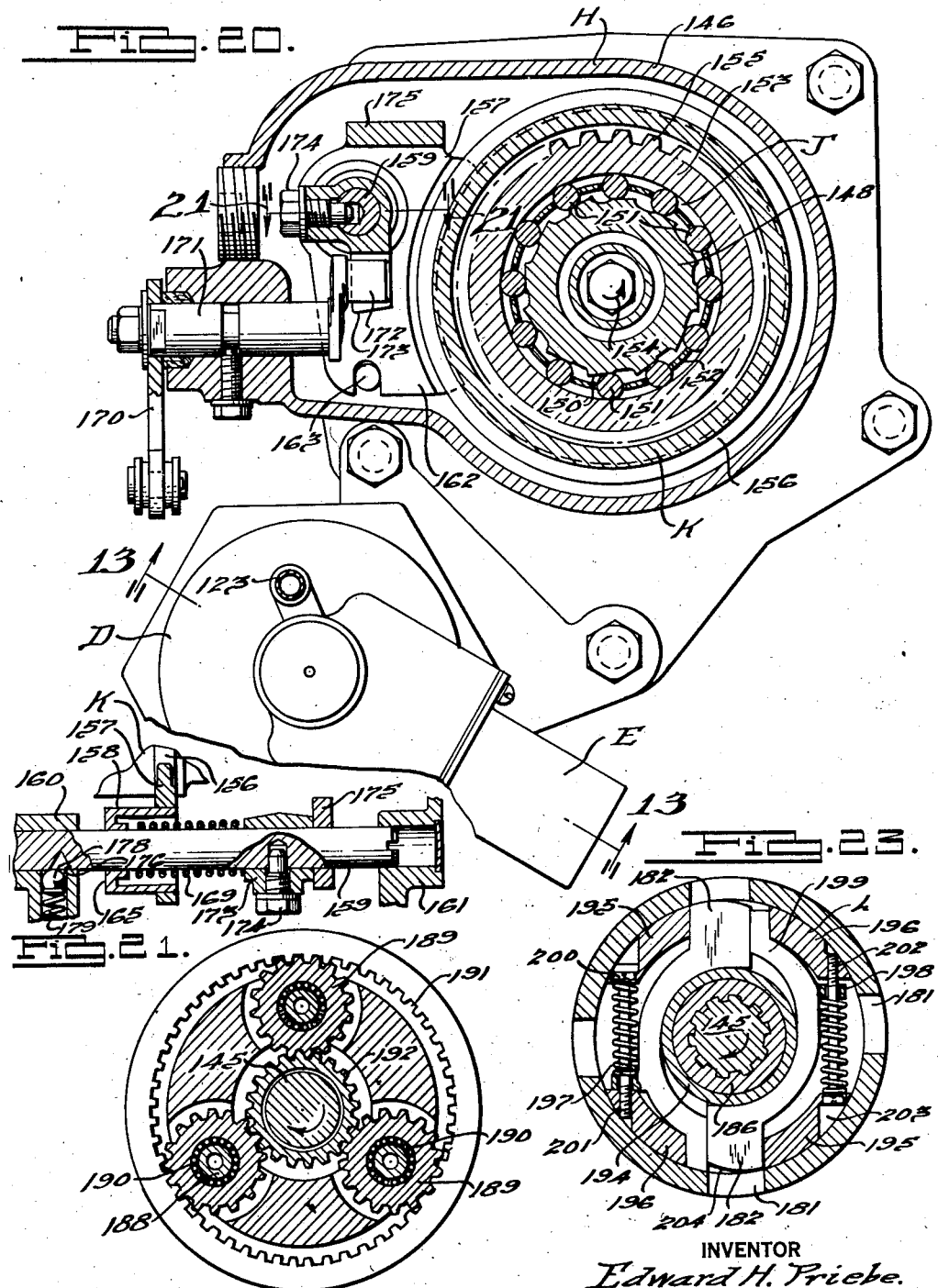

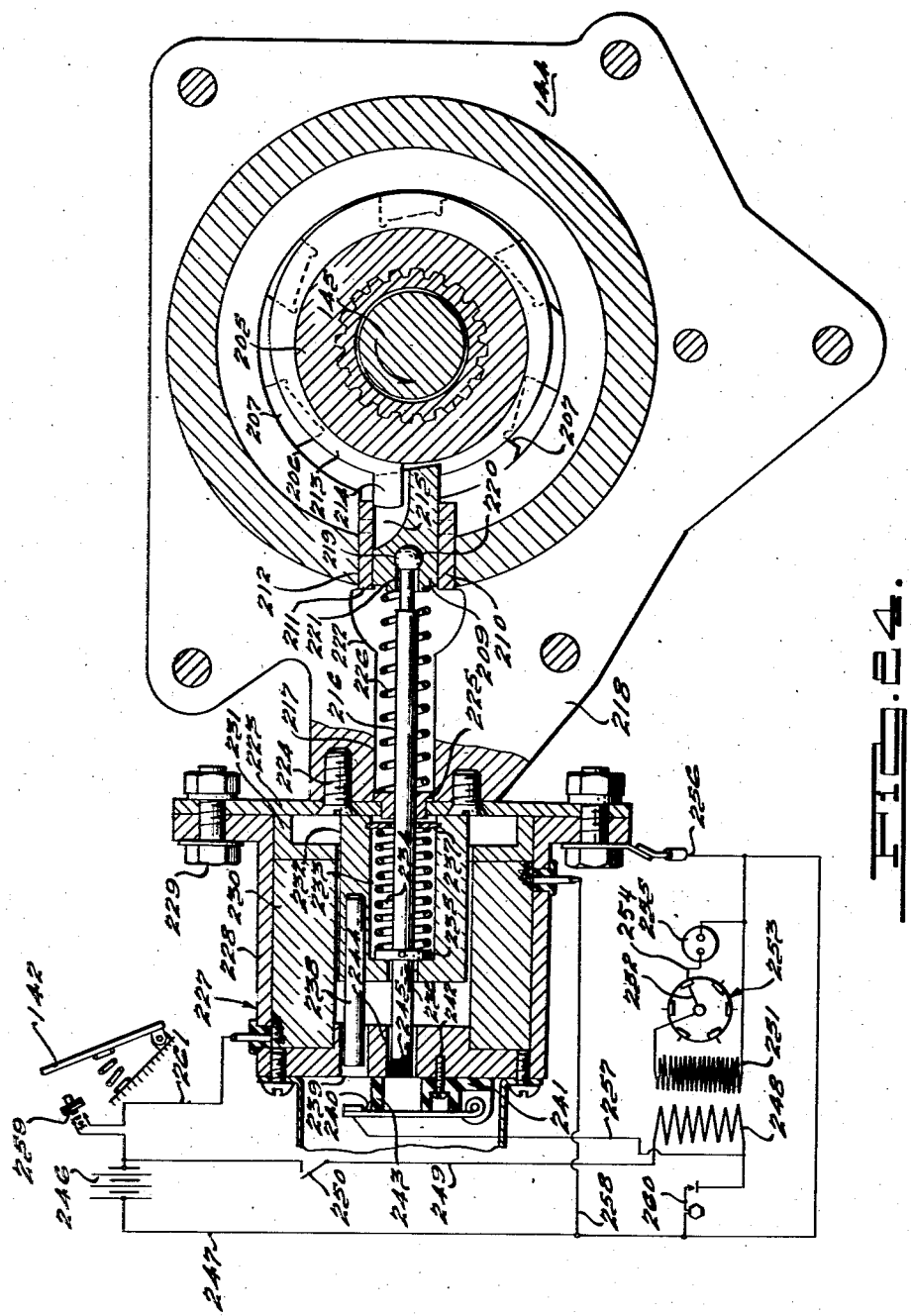

Patented May 18, 1943

2,319,515

UNITED STATES PATENT OFFICE 2,319,515

POWER TRANSMISSION

Edward H. Priebe, Detroit, Mich., assignor to Chrysler Corporation, Highland Park, Mich., a corporation of Delaware Application March 10, 1941, Serial No. 382,467

34 Claims. (Cl. 74—472)

This invention relates to power transmission and refers more particularly to improvements in drives for motor vehicles.

It is an object of my invention to provide improved speed ratio change means and control mechanism therefor.

Another object is to provide means for converting standard types of transmissions for automatic operation without undue complication or expense whereby existing transmissions and tooling therefor may be utilized but made to function in an improved manner, minimizing driving effort and increasing desirable car performance and change speed characteristics.

Another object is to provide means for effecting automatic speed ratio change, as between second and high in a standard type transmission, in conjunction with control means insuring disconnection of the drive between the vehicle drive wheels and the engine to prevent clash at the time of making the change.

A further object is to provide means for converting existing planetary overdrive and standard change speed transmission assemblies for improved operation whereby a plurality of automatic speed changes are obtained in an improved manner and the performance and control of the vehicle drive enhanced.

An additional object is to provide a plurality of step-up ratios so intercontrolled as to insure their sequential operation, one step-up ratio incorporating an overrunning control operating to facilitate operation of the other step-up ratio.

A still further object is to provide improved driver-operable shift control means for a vehicle drive according to any of the foregoing objects, the shift control preferably automatically providing an indicator for the performance of the transmission settings.

An additional object is to provide means automatically operating to set the transmission for forward drive as an incident to bringing the car to rest after drive in reverse.

Additional objects reside in the provision of change speed driving means incorporating step-up drive means operable upon release of the accelerator pedal at certain car speeds, this step-up drive means including positively engageable drive control elements and means automatically releasing the engine from the vehicle driving wheels to facilitate this step-up; also as a feature in addition to the first step-up, a second step-up operable upon release of the accelerator pedal at certain other car speeds, this second step-up also including positively engageable drive control elements which when engaged operate to render the engine releasing means inoperative.

Another object is to provide sequential operation of step-up drives with improved and simplified speed and kickdown control on one or more of the drives.

A further object is to provide an automatically operating transmission with a manually shiftable lever which also shifts automatically in response to automatic functioning of the transmission.

Further objects and advantages of my invention will be more apparent from the following example of one embodiment which my invention may assume, reference being had to the accompanying drawings in which:

Fig. 1 is a side elevational view illustrating the power transmission.

Fig. 2 is a plan view illustrating the selector lever, the view being taken as shown by line 2—2 of Fig. 1.

Fig. 3 is an enlarged sectional view of the selector mechanism taken as indicated by line 3—3 of Fig. 1.

Fig. 4 is a detail sectional view taken as indicated by line 4—4 of Fig. 3.

Fig. 5 is a sectional elevational view of the clutching drive means at the rear of the engine.

Fig. 6 is a transverse sectional view through the blocker synchronizing mechanism, the view being taken as indicated by line 6—6 of Fig. 16.

Fig. 7 is a diagrammatic top plan development of a part of the blocker synchronizing mechanism.

Fig. 8 is a fragmentary top plan view of a portion of the high or direct speed blocker illustrating the lost motion connection for obtaining the blocking action.

Fig. 9 is a side elevational view of the lower end of the steering post shift mechanism.

Fig. 10 is a sectional view taken as indicated by line 10—10 of Fig. 9.

Fig. 11 is a further sectional view taken as indicated by line 11—11 of Fig. 10.

Fig. 20 is a transverse sectional elevational view through the overdrive mechanism taken as indicated by line 20—20 of Fig. 12.

Fig. 21 is a sectional top plan view taken as indicated by line 21—21 of Fig. 20.

Fig. 22 is a sectional elevational view taken as indicated by line 22—22 of Fig. 16.

Fig. 23 is a sectional elevational view taken as indicated by line 23—23 of Fig. 16.

Fig. 24 is a further sectional elevational view as indicated by line 24—24 of Fig. 16, the electrical control for the sun gear being shown in diagrammatic form.

Figure 12:
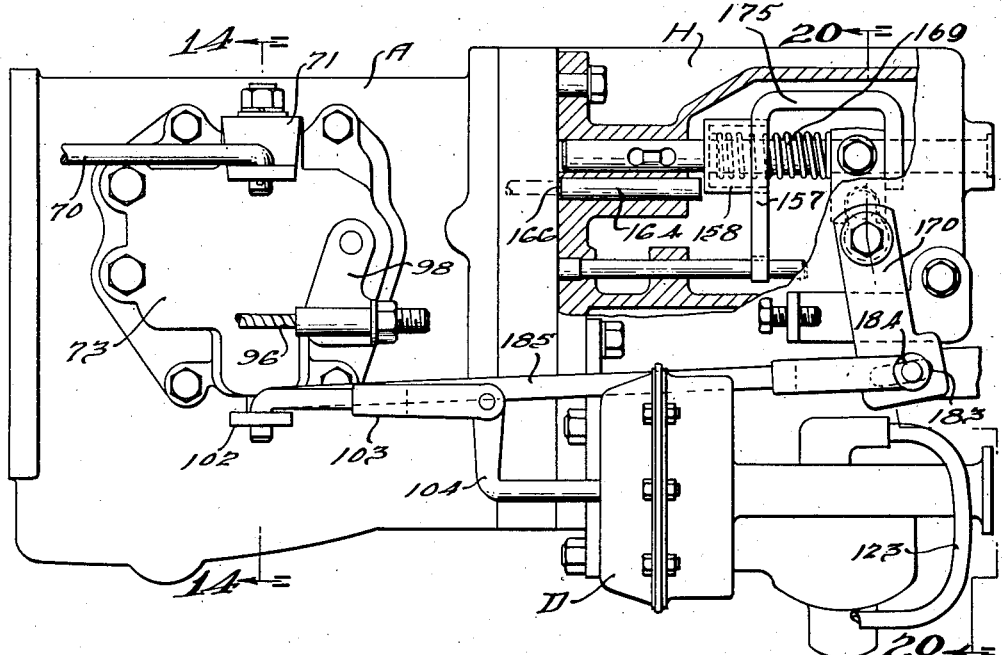
Fig. 12 is an enlarged side elevational view of the transmission as seen in Fig. 1, parts of the overdrive mechanism being broken away.

In carrying out my invention I preferably employ certain fundamental gearing mechanisms which have been commercially used on motor vehicles and which may be readily adapted to my invention. This effects considerable economy in that major tooling requirements are already available. However, the principles of my invention may, if desired, be utilized in a variety of arrangements other than the aforesaid commercially available devices. One of the gearing mechanisms now commonly known is the so-called "transmission" of conventional form having three forward speeds and a reverse, the other gearing mechanism now commonly known being the overdrive mechanism usually arranged to receive the drive from the standard transmission.

Because of the flexibility of control obtained by my invention, especially when used with a fluid coupling, I preferably eliminate as unnecessary the lowest drive ratio which is generally called "first" or low in the standard transmission. This also provides a place for taking off the drive for governor control on the speed ratio change, the governor drive gear taking the place of the conventional low speed countershaft gear as will presently be more apparent.

In instances where the conventional low speed gear is replaced by a governor drive, I preferably provide means for preventing the driver from shifting the selector lever into the conventional first speed position, such means also preventing accidental entry of the shift lever into such position. With such arrangement the shift lever has three positions which in conventional practice would correspond to "second," high or direct, and reverse. However, inasmuch as there is no first speed in such arrangement, the positions of the shift lever for second and high will be hereinafter referred to as low and high positions or ranges.

The illustrated shift mechanism, which I have modified to accommodate my transmission control, is fundamentally that disclosed in the copending application to F. W. Slack, Serial No. 293,657 filed September 7, 1939. This shift mechanism comprises a manually operable lever 30 mounted below the usual vehicle steering wheel 31. This lever has an inner yoked end pivotally connected at 32 with the head 33 fixed to the upper end of an actuating shaft 34 surrounding the steering shaft 35. Lever 30 is fulcrummed at 36 within the arcuately slotted portion 37 of the housing 38 fixed to the steering post 39. The shift lever is illustrated in its neutral position, the arrangement being such that shifting the lever forwardly from neutral provides the low range and pulling the lever backwardly from neutral provides the high range. For reverse, the lever is lifted when in neutral and then swung forwardly.

Figure 13:
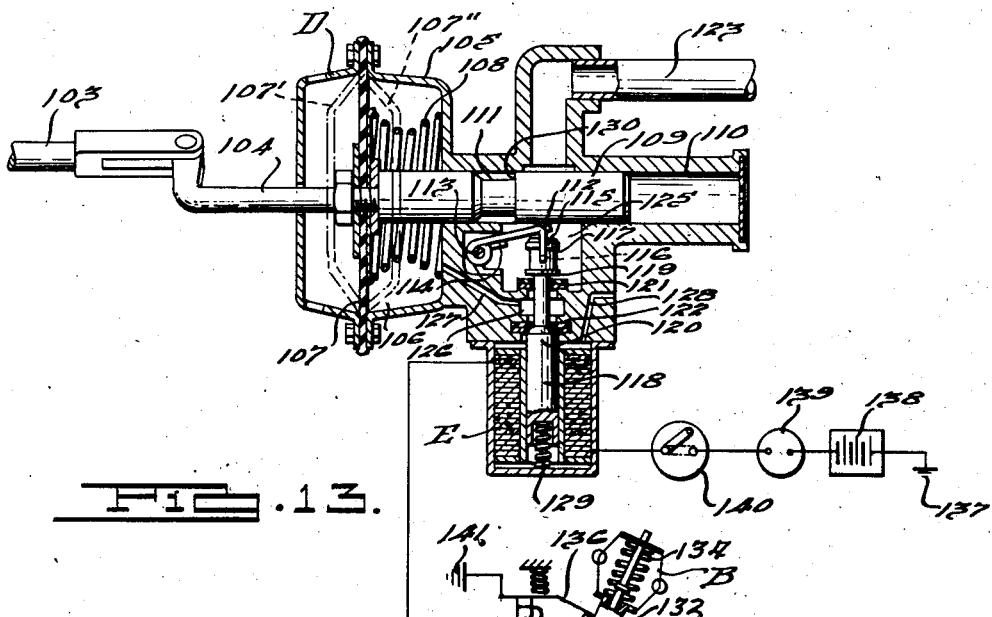
Fig. 13 is a sectional view of the vacuum motor taken as indicated by line 13—13 of Fig. 20, this view also illustrating the governor control and wiring diagram.

The transmission A (Figs. 15 and 16) comprises a main drive pinion 40 carrying a set of direct drive clutch teeth 41, this pinion being in constant mesh with the gear 42 of the countershaft cluster 43 which also carries the low range drive gear 44 and a reverse gear 45. While the usual first speed countershaft gear may be provided according to conventional practice to provide a slower drive of greater torque multiplication than is provided by gear 44, I preferably modify this conventional first speed gear by providing in its place a governor drive gear 46 meshed with a gear 47 for driving governor B (Fig. 13).

Gear 44 constantly meshes with gear 48 rotatably mounted on the transmission main output shaft 49 which is splined for sliding drive connection with the shiftable reverse gear 50. When gear 50 is shifted rearwardly it will mesh with reverse idler gear 51 which is in constant mesh with gear 45, thereby driving shaft 49 in a reverse direction relative to the normal clockwise direction when looking front to rear. The gear 48 carries a set of clutch teeth 52 similar to teeth 41.

In order to selectively clutch the output shaft 49 with either of teeth 41 or 52, I employ any suitable blocker synchronizing mechanism as best shown in Figs. 6, 7, 8, and 16. This is a well known commercial type of mechanism and comprises a hub 53 fixed to shaft 49, the hub having external teeth 54 for connection with the internal teeth 55 of clutch sleeve C such that the teeth 55 may clutch teeth 41 or 52 with shaft 49 to provide the high or low drives. In order to limit clutching shift of sleeve C to conditions of synchronization and in order to synchronize the parts to be clutched in response to shift of this sleeve, there is provided a blocker ring 56 frictionally engageable at the cone 57 of pinion 40 and having cammed teeth 58 pointed toward similarly cammed ends of the sleeve teeth 55. A plurality of thrust-transmitting struts 59 are rotatably fixed to hub 53 but slidable axially thereof by friction connection with the inner surface of sleeve C, the friction connection being maintained by expansion springs 60. The forward ends of the struts bear against the face 61 of a circumferentially elongated slot 62 in blocker 56 such that the blocker will drive with hub 53 but is capable of limited rotation relative to the hub sufficient to align blocker teeth 58 with the ends of sleeve teeth 55.

When sleeve C is shifted forwardly, struts 59 cause blocker 56 to engage cone 57 and blocker 56 will rotate relative to hub 53 in one direction or the other to bring struts 59 at one end of slot 62. In such position the sleeve cannot shift further as it is blocked by teeth 58. However, the cammed teeth 55 act on the cammed blocker teeth with servo action to cause sufficient friction at cone 57 so that pinion 40 is brought to synchronism with sleeve C, the cammed teeth then causing the sleeve teeth to pass between the blocker teeth 58 to clutch with teeth 41. During such travel of sleeve C this sleeve slides relative to the struts 59. The clutching shift of sleeve C from neutral to engage teeth 41 takes place very rapidly, accompanied of course with some suitable means for operably disconnecting the vehicle driving rear wheels from the engine as will presently be more apparent.

Shift of sleeve C rearwardly to clutch with teeth 52 is under blocking synchronizing control of a blocker ring 63 having cammed blocker teeth 64 functioning in the same manner as that aforesaid in providing blocker synchronization between gear 48 and shaft 49. In this manner sleeve C rapidly clutches with teeth 41 or 52 without any possibility of clash or damage to the mechanism.

By preference, the shift lever 30 is arranged so that sleeve C may be shifted independently of the power operation of the sleeve, also so that when the sleeve is shifted by power then lever 30 will be automatically shifted and serve as an indicator to the driver of the speed ratio change and setting.

Figures 18, 19:
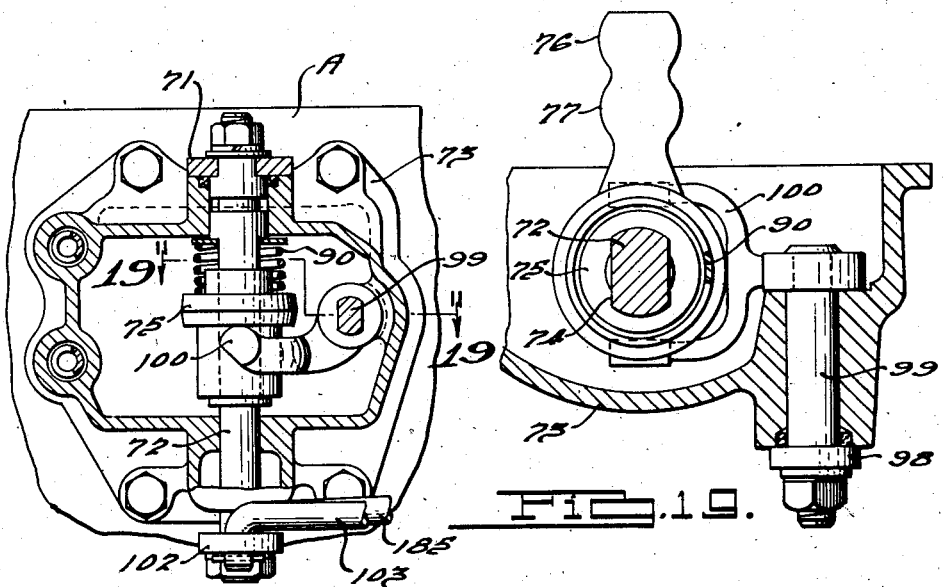
Fig. 18 is a detail sectional side elevational view taken as indicated by line 18—18 of Fig. 15.
Fig. 19 is a sectional top plan view taken as indicated by line 19—19 of Fig. 18.

At its lower end the shaft 34 (Figs. 9 to 11) has fixed thereto a lever 65 having an intermediate wide portion 66 and an outer end portion pivotally connected at 67 to a link 68 which is operably connected through a bellcrank lever 69 (Fig. 1) and link 70 to a horizontally extending lever 71 which is fixed to the upper end of vertical rockshaft 72. This shaft 72 is suitably journalled in the transmission side cover 73 and has an intermediate portion formed with flats 74 for mounting an operating selector lever 75 which may slide along shaft 72 but which cannot rotate relative to the shaft. This lever 75 has a pair of shift portions 76, 77 (Figs. 15 and 19) respectively adapted to selectively engage suitable recesses in the portions 78, 79 of shift yokes 80, 81 respectively connected to gear 50 and sleeve C.

Figure 17:
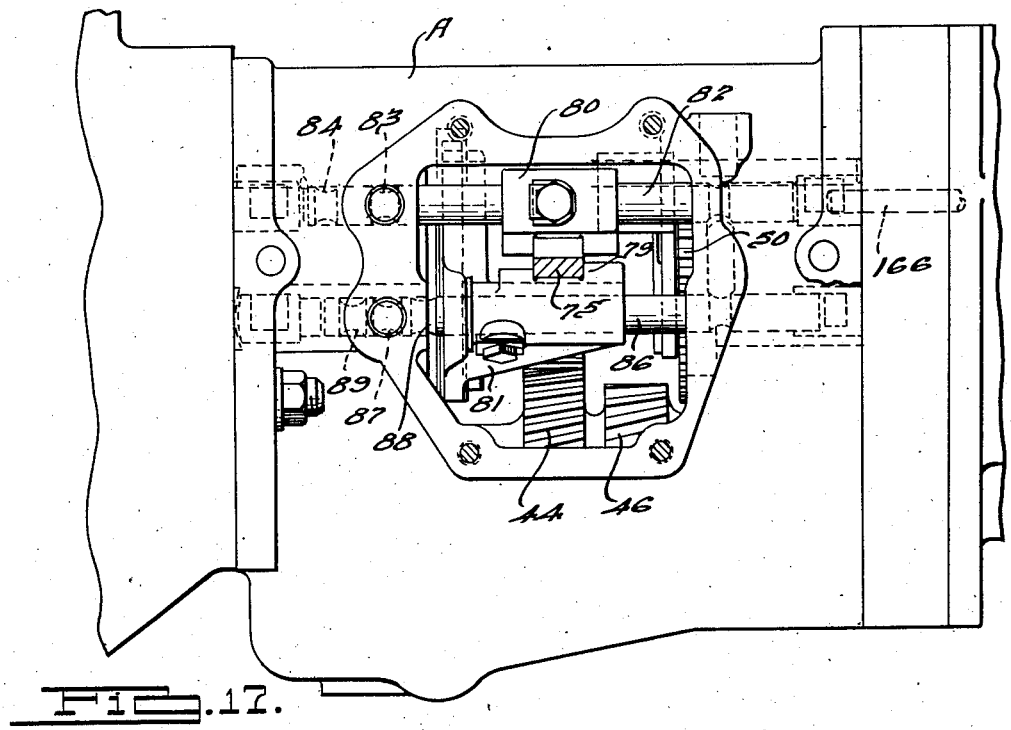
Fig. 17 is a sectional side elevational view taken as indicated by line 17—17 of Fig. 14.

Yoke 80 is carried by and fixed to a reverse shift rail 82 and has grooves 83, 84 cooperable with the usual detent 85 to releasably fixed gear 50 in its neutral and reverse drive positions. Likewise yoke 81 is fixed to a rail 86 and has detent grooves 87, 88, 89 (Fig. 17) for releasably fixing the rail 86 and sleeve C in positions of neutral, low, and high. A spring 90 (Fig. 14) yieldingly urges lever 75 to its position of engaging yoke 81 and by lifting lever 75 the shaft 72 may be operatively disconnected at 77, 79 from yoke 81 and operatively connected with yoke 80 at 76, 78. In the neutral position of selector lever 30 the shaft 72 is thus connected to yoke 81 so that shift of lever 30 to the low or high range will correspondingly shift sleeve C to clutch with teeth 52 or 41 through the aforesaid linkage between levers 65 and 71.

In order to lift lever 75 for the reverse drive, a bell crank lever 91 (Figs. 9, 10) is pivotally mounted at 92 and has one lever end 93 bearing beneath the portion 66 of lever 65, the other lever end 94 being pivotally connected at 95 to a Bowden wire mechanism 96. Lever 91 is yieldingly urged by a spring 97 so as to maintain lever end 93 engaged with lever portion 66. The Bowden wire 96 extends rearwardly for connection with a lever 98 (Figs. 1, 15 and 19) which is fixed to a horizontal shaft 99 to the inner end of which is fixed a yoked lever 100 engaging lever 75.

When shift lever 30 is lifted from its neutral position, the bellcrank lever 94 swings clockwise in Fig. 9 to cause Bowden wire 96 to act through levers 98 and 100 to lift lever 75 to connect shaft 72 with yoke 80. Then by shifting lever 30 forwardly the lever 65 acts to rotate shaft 72 for meshing gear 50 with reverse idler 51 for the reverse drive, sleeve C remaining in its neutral position. Yokes 80, 81 are slidably guided by a fixed rod 101, the yokes freely sliding relative to this rod. When lever 30 is returned from reverse to neutral, spring 90 acts, being stronger than spring 97, to move lever 75 downwardly to the Fig. 14 position of engagement with yoke 81, lever 30 being then ready to establish low or high by shifting the same forwardly or rearwardly.

In order to effect automatic power shift of sleeve C, I provide a second lever 102 fixed to shaft 72 at the lower end thereof, this lever being connected through link 103 with the operating rod 104 of a power device or motor D. In the present embodiment this motor is pressure fluid operated, preferably by utilizing the vacuum of the usual engine intake system.

The motor D comprises a cylinder 105 forming a pressure chamber 106 for actuating a piston 107 secured to rod 104. A relatively heavy spring 108 urges piston 107 forwardly to the position 107' and when vacuum acts in chamber 106 the piston 107 is actuated rearwardly to the position 107''. Rod 104 has a rear enlargement 109 slidable in bore 110, this rod portion having a shouldered groove 111 cooperable with a latch 112 pivotally mounted at 113 and yieldingly urged toward rod portion 109 by a rat trap spring 114. The latch 112 has an arm portion 115 formed with an in-turned finger 116 engageable with shoulder 117 of plunger 118 the outer end of which is the armature of a solenoid E. Plunger 118 has valving portions 119, 120 respectively adapted to close or open valving passages 121, 122.

The passage 121 controls vacuum supply to chamber 106 by a system of conduits comprising pipe 123 leading from intake manifold 124 of engine F to chamber 125, thence by passage 121 to chamber 126 and passage 127 to chamber 106. Passage 122 controls venting of chamber 106 by opening the latter to the atmosphere through passage 127, chamber 126 and passages 122 and 128.

In Fig. 13 solenoid E is de-energized thereby allowing a spring 129 to move plunger 118 inwardly to cause valve 120 to close passage 122 and valve 119 to open passage 121. At this time shoulder 117 is sufficiently removed from finger 116 so that when piston 107 is moved to position 107'' by vacuum which is then acting on the piston, latch 112 will engage the shoulder 130 of groove 111 and releasably hold the piston in such position independently of vacuum. When solenoid E is energized, plunger 118 moves outwardly releasing latch 112 from shoulder 130, and the chamber 106 is now vented because valve 119 is seated at 121 and valve 120 is unseated.

Figure 14:
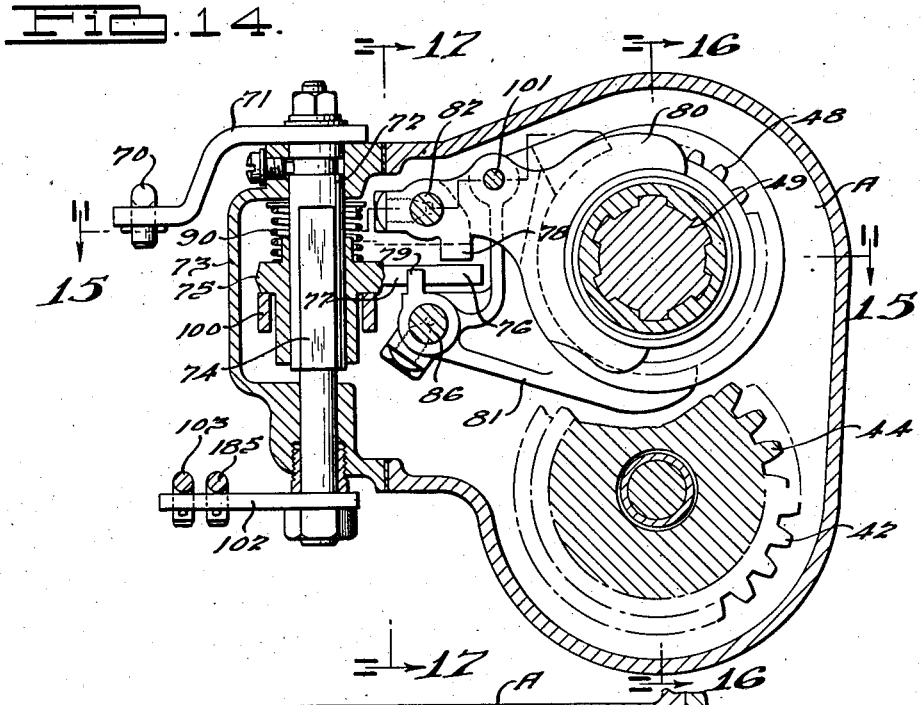
Fig. 14 is a transverse sectional elevational view through the transmission taken as indicated by line 14—14 in Fig. 12.

When rod 104 moves forwardly by spring 108, solenoid E being energized to release latch 112 and vent chamber 106, shaft 74 is rotated to cause yoke 81 to shift rearwardly thereby establishing the low drive by clutching sleeve C with teeth 52, assuming lever 75 to be positioned as in Fig. 14. When rod 104 moves rearwardly by vacuum, solenoid E being de-energized to cause latch 112 to engage shoulder 130, yoke 81 is operated forward for the high range drive by clutching sleeve C with teeth 41. Power shifts of sleeve C are, like the manual shifts, under control of blocker synchronizer rings 56 and 63 and these shifts cannot be made at any time, by power or manual operation, unless a condition of synchronization exists between sleeve C and the teeth 41 or 52 depending on the direction of shift of the sleeve.

The operation of motor D is preferably under control of suitable governor means such that its operation is a function of car speed. I have therefore provided the governor B (Fig. 13) for controlling energization of solenoid E, this governor comprising a shaft 131 driven by gear 47 so as to cause the sleeve 132 to move outwardly at predetermined car speed, this movement being under control of a detent 133 if desired. A spring 134 resists outward movement of sleeve 132, the latter having a shoulder 135 engaged by a swinging switch arm 136 for control of a governor switch G.

The switch G controls an electrical series circuit from ground 137, battery 138 and ammeter 139 to the usual ignition switch 140 (shown open in Fig. 13) thence to solenoid E, switch G and ground 141. When the car is at standstill the switch G is closed thereby energizing solenoid E when ignition switch 140 is closed preparatory to starting the engine. This directs shift of sleeve C to low and as the car is accelerated to a predetermined desired speed then governor B opens switch G to de-energize solenoid E thus opening chamber 106 to manifold 124. However as long as driving torque is being delivered from the engine between teeth 52 and sleeve C the sleeve cannot shift forwardly from its rearmost position. An accelerator pedal 142 of conventional type controls the engine throttle valve 142ᵃ in the well known manner and when this pedal is released, wholly or partly, then the driving torque is relieved to allow forward shift of sleeve C. At the same time the attendant high vacuum causes piston 107 to move to 107", latch 112 holding the piston in this position as soon as the piston has completed this stroke. As the piston moves under vacuum, sleeve C is thrust forwardly to disengage teeth 52 and to act on blocker synchronizer 56 rapidly synchronizing teeth 41 with the speed of sleeve C and shaft 49 whereupon sleeve C completes its forward shift clutching with teeth 41. This transition from low to high takes place during engine coast, the synchronizing action being thereby assisted by the engine naturally slowing down. Furthermore the change from drive to coast torque at teeth 52 unloads the sleeve C to allow the disengagement of the sleeve from the low drive. As the car decreases in speed from a condition of drive in high, governor B causes switch G to close thereby releasing latch 112 and venting chamber 106. This produces a change from high to low. If a drive load is present at teeth 41 sufficient to prevent shift of sleeve C rearwardly by spring 108, then disengagement of the sleeve will be delayed until the accelerator pedal is released. Under such conditions sleeve C is unloaded and shifts rearwardly, with blocker synchronizer action at ring 63, to clutch with teeth 52. If the engine is coasting, as in bringing the car to rest from a drive in high, spring 108 will cause shift of sleeve C to engage teeth 52 as the coast torque diminished at teeth 41, somewhat sooner if the coast torque is relieved by depressing the accelerator pedal.

In order to prevent shift of lever 30 into conventional first where this speed is omitted in the transmission, I have provided means for blanking out or preventing such shift. This comprises a pin 142' projecting upwardly from the fixed housing of steering post 35 (Fig. 11). In shifting lever 30 between its high and low range positions the lever 65 freely moves clear of the upper end of this pin but when lever 65 is depressed by rocking lever 30 at neutral then pin 142' prevents forward shift of the lever but does not interfere with rearward shift thereof for reverse.

In order to facilitate shift of sleeve C automatically back and forth as a function of car speed, I preferably provide automatic disconnection of the engine and vehicle driving ground wheels. In the present embodiment of my invention this disconnection is located in the auxiliary mechanism H herein illustrated as a known commercial type of kickdown overdrive selected because of its commercial availability and because it affords functional characteristics which serve certain of the operating functions of transmission A. The illustrated mechanism H is of the type disclosed in the copending application of E. F. Webb, Serial No. 216,003 filed June 27, 1938.

The transmission shaft 49 is the driving shaft for the overdrive mechanism H and is journalled in a bearing 143 carried by the intermediate member 144, the shaft 49 having a rearward driving extension 145 which projects into the overdrive casing 146 and which is formed with splines 147.

Figure 16:
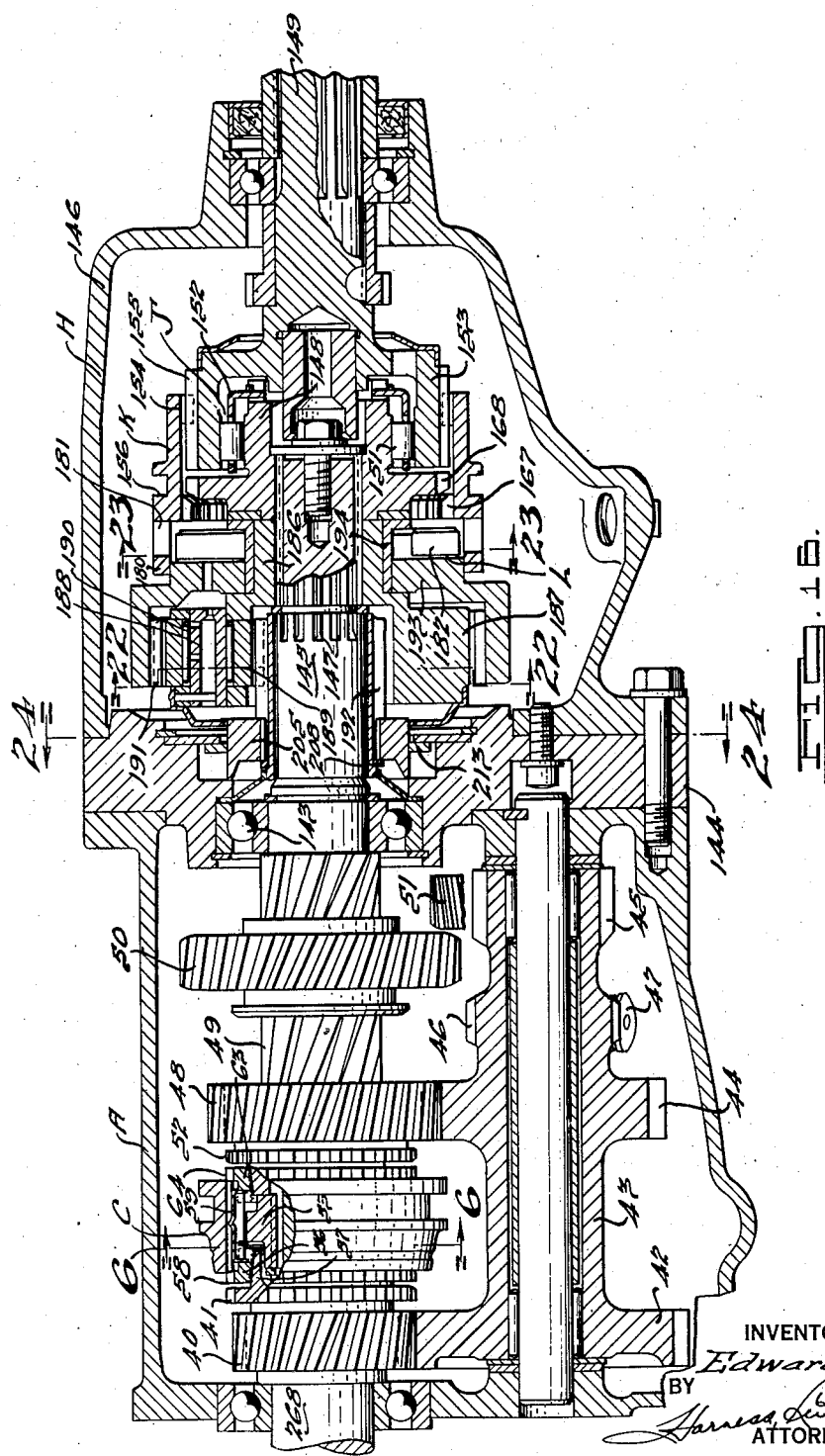
Fig. 16 is a transverse side elevational view through the transmission and overdrive mechanisms taken as indicated by line 16—16 of Fig. 14.

Engaging splines 147 at the rear end of driving shaft extension 145, is the inner member 148 of an overrunning clutch J which provides a releasable forward direct driving means from shaft 49 to the driven shaft 149. The shaft 149 extends as usual for driving through a propeller shaft (not shown) and other conventional mechanism to drive the rear vehicle ground wheels. As best shown in Figs. 16 and 20, the inner member 148 is formed with the usual cam faces 150 engaged by clutching rollers 151, the rollers being spaced by the usual cage 152. The outer member of the overrunning clutch E comprises a cylinder 153 formed as an enlarged forward projection of the driven shaft 149. When the driving shaft 49 has a forward direction of rotation imparted thereto, as indicated by the arrow 154 in Fig. 20, and with the overdriving mechanism inoperative, the rollers 151 will be wedged between the inner and outer member 148 and 153 respectively of the overrunning clutch J so that the driven shaft 149 will be driven in a forward direction with the driving shaft 49. However, in the event that the driving shaft tends to slow down relative to the driven shaft, or in the event that the driven shaft tends to rotate forwardly faster than the driving shaft, the rollers 151 will be released from wedging action and such tendencies of the shafts to rotate relatively to one another will be readily accommodated.

It will be apparent that in order to drive shaft 149 in a reverse direction from the shaft 49, as when the gear 50 is shifted rearwardly to mesh with the reverse idler gear 51 for driving the vehicle in reverse, some means must be provided to render the overrunning clutch J inoperative in order to establish a drive connection between these shafts. In the present embodiment of the invention, this is accomplished by reason of a shiftable clutch sleeve K having a set of splined teeth 154 slidably engaging the external splines 155 formed on the cylindrical member 153. The shiftable sleeve K is provided with a groove 156 engaged by shift yoke 157 to which is welded a cup 158 through which a shift rod 159 may freely slide. This rod is slidably supported in fixed bosses 160, 161. The yoke 157 has a downwardly extending guide portion 162 (Figs. 12 and 20) which is slidably supported on a stationary guide rod 163.

Figure 15:
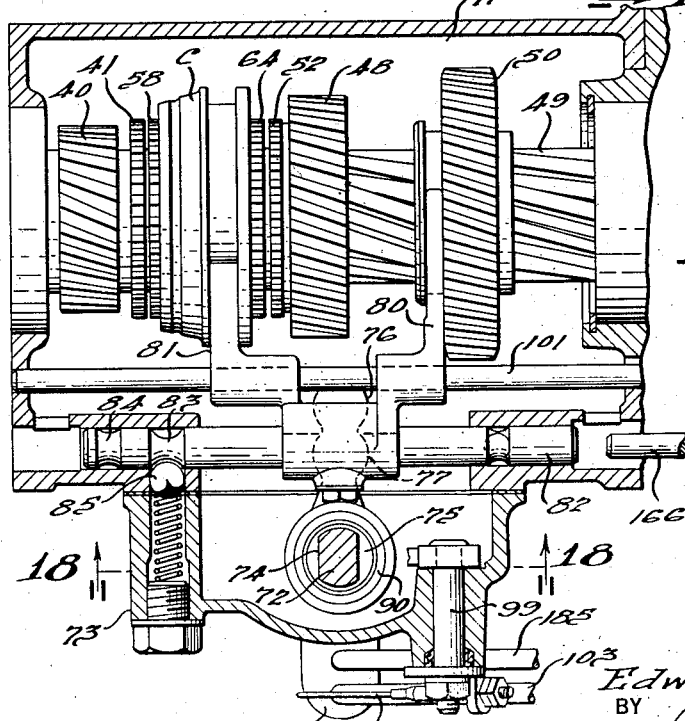
Fig. 15 is a sectional plan view of the Fig. 14 mechanism taken as indicated by line 15—15 in Fig. 14.

Located just below the forward end portion of rod 159 is a second rod 164 shiftable in boss 160 and having its rear end engaged with the face 165 of cup 158 when sleeve K is in its forwardmost position. The front end of rod 164 has a reduced cross-section at 166 and lies in the path of rearward shift of reverse rail 82 (Fig. 15). Therefore when shift lever 30 is manipulated for reverse drive, rail 82 in shifting gear 50 into mesh with reverse idler 51 thereby causes rod 164 to shift rearwardly. This acts on cup 158 to cause yoke 157 to shift sleeve K rearwardly to engage teeth 167 thereof with teeth 168 which are carried by the part 148 and therefore always rotating with shaft 49. Thus a two-way direct drive is established between shafts 49 and 149 as an incident to establishing the reverse drive in transmission A. In returning rail 82 to neutral from its reverse position, a spring 169 acts on cup 158 to shift sleeve K to disengage teeth 167 from teeth 168.

Limited shift of sleeve K, independently of shift of rail 82, is also provided in order to effect sequential operation of sleeve C and mechanism H and also to facilitate operation of transmission A. This control comprises a lever 170 fixed to a horizontal rockshaft 171 which, at its inner end, is provided with a crank 172 fitting a yoke 173 fixed at 174 to shaft 159. The yoke 157 has an arched rearward extension 175 (Figs. 12, 20 and 21) through which rod 159 is freely slidable, this yoke portion engaging the rear face of yoke 173 (Fig. 21). The rear end of spring 169 bears against the front face of yoke 173.

Rod 159 has its forward end portion formed with a notch 176 engageable by a ball detent 178 pressed by a spring 179 toward rail 159. When rail 159 is fully forward then detent 178 engages notch 176 and yieldingly holds rail 159 such that cup 158 may shift sleeve K to lock out the overrunning clutch J without shifting movement of rail 159, as during reverse. The position of rail 159 when detent 178 engages notch 176 is such that over-drive in mechanism H is allowed to operate. When rail 159 is shifted slightly rearwardly, as in Fig. 21, about one-sixteenth of an inch then teeth 167 will not engage teeth 168 but the overdrive is prevented from operating as will be presently apparent. Extending forwardly from groove 156 the sleeve K is formed with one clutching portion 180 of an automatic clutch L, the portion 180 having a plurality of slots 181 adapted, when sleeve K is in its forwardmost position, to be radially aligned with clutching pawls 182 so as to accommodate entry of these pawls into the slots for establishing the overdrive in mechanism H. If the slots are slightly offset from the pawls in a direction axially of shafts 49 and 149 as shown in Fig. 16 then the pawls cannot enter the slots and the overdrive cannot take place. In order to control the overdrive as a function of the operation of transmission A, I have provided the following means controlling shift of sleeve K.

The lower end of lever 170 is provided with a slot 183 (Fig. 12) slidably receiving the pin 184 carried by the rear end of a link 185 whose forward end has articulated connection with the lever 102 (Figs. 14 and 15) adjacent the forward end of link 103. The length of slot 183 bears a definite relationship to the travel of lever 102 in moving sleeve C between its positions of forward and rearward shift, the arrangement being such that lever 107 is shifted by link 185 only at the final part of shift of sleeve C.

Assuming for example that sleeve K is in the Fig. 16 position misaligning slots 181 with respect to pawls 182 and that the car is being driven in the low range at transmission A and in freewheeling direct at mechanism H and that the accelerator pedal is then released so that motor D is operating under vacuum to shift sleeve C forwardly for effecting high range drive. Sleeve C in conjunction with blocker ring 56 effects synchronizing of gear 40 and sleeve C as aforesaid whereupon sleeve C clutches with teeth 41. After the teeth 55 of sleeve C have established engagement with teeth 41, the pin 184 is at the rear end of slot 183 whereby completion of the forward shift of sleeve C then swings lever 170 counterclockwise (Fig. 12) an amount sufficient to shift sleeve K forwardly to align slots 181 with pawls 182 to accommodate operation of the overdrive. This swing of lever 170 causes crank 172 to act on yoke 173 to shift rail 159 forwardly to allow detent 178 to enter notch 176, spring 169 transmitting the forward movement to cup 158 and thence through yoke 157 to sleeve K.

Assuming pawls 182 are released from slots 181 and that the car is being brought to rest after drive in the high range and overdrive. As sleeve C is shifted rearwardly by spring 108 from its high range position to its low range position of clutching with teeth 52 under blocking synchronizing control of ring 63, pin 184 will have moved forwardly in the lost-motion slot 183 so that after initial clutching of sleeve teeth 55 with teeth 52 then pin 184 will swing lever 170 clockwise (Fig. 12) for a small amount. This lever swing causes yoke 173 to shift rail 159 rearwardly to the Fig. 21 position, the yoke 173 acting on yoke part 175 to shift sleeve K to the Fig. 16 position. I have found that there is sufficient friction in the mechanism controlling shift of sleeve K so that in operation this sleeve will remain in the Fig. 16 position and rail 159 in the Fig. 21 position until forward shift of sleeve C again causes pin 184 to return sleeve K to its position of aligning slots 181 with pawls 182.

The foregoing control insures sequential stepup in the drives of transmission A and mechanism H, the illustrated arrangement being such that step-up at H cannot occur until after the step-up at A has taken place. Furthermore this arrangement insures automatic disconnection of the engine and vehicle drive wheels when changes in speed ratio take place in transmission A as well as in mechanism H because overrunning clutch J is not rendered inoperative by engagement of clutch L until after completion of the high range drive at A. This insures rapid synchronized shifts for the sleeve C because sleeve C in shifting does not have to operate against engine power, it being noted that shifts of sleeve C take place during engine coast produced by slackening on the accelerator pedal.

Engaging the splines 147 forwardly of the overrunning clutch member 148, is the cylindrical hub portion 186 of a planet gear carrier 187 mounting a plurality of hollow shafts 188, one of which is illustrated in Fig. 16.

Each shaft 188 journals a planet gear 189 by anti-friction bearings 190. The planet gears 189 are in constant mesh with an internal gear or annulus 191 and also with a sun gear 192 through which the shaft extension 145 passes for rotation relatively thereto. Further details of the construction and operation of the sun gear 192 will be set forth subsequently in connection with the control therefor.

Drivingly carried by the internal gear 191 is a pawl-carrying cage or core 193 of the automatic speed responsive clutch generally designated at L. The cage 193 is rotatably centered on the hub 186 preferably through an intermediate bushing 194.

The automatic clutch L is best illustrated in Fig. 23 wherein it will be noted that the cage 193 is formed with the pairs of diametrically opposite rearwardly extending projections 195 and 196 adapted to slidably guide the centrifugal elements or pawls 182 outwardly for positive synchronous clutching with one of the slots 181 of the aforesaid companion clutching structure in the form of the cylindrical shell 180 formed as an integral forward extension of the shiftable sleeve K.

Each pawl 182 is yieldingly urged inwardly or to its retracted declutched position of engagement with the bushing 194 as illustrated in Fig. 23 by a coil spring 197 which acts against the abutment 198 of the pawl counter-balancing yoke portion 199. The other end of each coil spring 197 engages an abutment 200 formed as the head of an adjustable bolt 201 which slidably projects through the abutment 198 for adjustable threaded connection at 202 with a cage projection 196. Each bolt head 200 is accessible for adjustment exteriorly of the automatic clutch by aligning one of the slots 181 with an opening 203 in which the bolt head 200 is disposed, and by rotatably adjusting the bolts 201 it will be apparent that the compression of the coil springs 197 may be varied to change the load upon the pawls 182 and thereby vary the critical speed at which the pawls will fly outwardly under centrifugal force acting thereon for clutching engagement with one of the slots 181. Each pawl 182 has an outer face which is cammed at 204 so that the pawls will jump the slots 181 when the pawls are urged outwardly by centrifugal force prior to synchronizing the speeds of rotation of the cage 193 and the shell 180.

In the operation of the overdriving mechanism H as thus far described, let it be assumed for the moment that the sun gear 192 is held against rotation and that the parts are positioned as illustrated in Fig. 16 but with sleeve K shifted forwardly to align slots 181 with pawls 182. The motor vehicle is accelerated in direct drive from shaft 49 through the overrunning clutch J to the driven shaft 149. For purposes of illustration, let it be further assumed that the critical speed of the automatic clutch L is such that the pawls 182 will be held inwardly by the coil springs 197 until the motor vehicle is driven at approximately M miles per hour, so that when the vehicle is driven at or above this speed the pawls will be urged outwardly but cannot engage the slots 181 by reason of the relatively different speeds of rotation of the cage 193 and shell 180 in conjunction with the cammed pawl faces 204. Thus during this drive of the motor vehicle, the slots 181 are rotating forwardly at the same speed as that of the driven shaft 149 whereas the pawls 182 together with the cage 193 and internal gear 191 are rotating forwardly at a speed faster than that of the driven shaft by the amount of the overdriving planetary gearing ratio incident to driving the planet cage 187 at the speed of rotation of driving shaft 49 while holding the sun gear 192 relatively stationary.

When the motor vehicle is thus driven at or above the critical speed of operation M of the automatic clutch L, the overdrive is brought into operation by a momentary reduction in the speed of the driving shaft 49, accommodated by overrun at the overrunning clutch J, this reduction in speed being conveniently brought about by the vehicle drive releasing or partially releasing the accelerator pedal with an accompanying throttle-closing operation at the engine F.

As the speed of rotation of the driving shaft 49 slows down, the pawls 182 will be synchronized with the shell 180 and at such time the pawls will fly outwardly for clutching engagement with one of the slots 181 to thereupon couple shafts 49 and 149 by a two-way drive connection through the planetary gearing. The clutch L is similar to the clutching by sleeve C in that each is constituted by relatively engageable drive control elements of a positively engaging character as distinguished from frictional clutching.

As hereinbefore noted, this two-way drive connection provides an overdrive from the driving shaft 49 to the driven shaft 149 and the vehicle will be driven from the engine through transmission A to the planetary gearing, assuming that the sun gear 192 maintains its relatively stationary condition, until the speed of the motor vehicle is reduced appreciably below the aforesaid critical speed M of automatic clutch engagement, at which time the coil springs 197 will operate to retract the pawls to the Fig. 23 position thereby releasing the drive through the planetary gearing and restoring the drive through the overrunning clutch J, it being apparent that this clutch will overrun during the aforesaid overdrive. By altering the adjustment of the bolts 201 or by replacing the coil springs 197 with other springs of differing values, it will be apparent that the automatic clutch may be made to function at any desired speed of the motor vehicle.

When gear 50 is shifted for reverse drive, thereby engaging teeth 167 with teeth 168 to render clutch J inoperative, clutch L is also rendered inoperative because slots 181 are then misaligned with respect to pawls 182.

As will presently be more apparent there is provided a secondary controlling means for the overdriving mechanism by reason of which the sun gear 192 may be released at the will of the vehicle driver and since the sun gear 192 takes the reaction of the overdrive, it will be apparent that when the sun gear is allowed to freely rotate the overdrive mechanism will be rendered inoperative even in the event that the automatic clutch L is engaged at the time of release of the sun gear.

The additional control means whereby the speed change mechanism H may be quickly and conveniently manipulated to establish a slower driving speed ratio, direct or 1 to 1 in this instance, is conveniently termed a "kick-down" control, and is shown in conjunction with the sun gear. In this arrangement the sun gear can be released for rotation to thereby release the overdrive and effect a change in the speed ratio drive through a slower drive in the mechanism H.

The releasable holding means for the sun gear preferably is of a known available commercial type and comprises a pawl and ratchet arrangement or other relatively movable drive control elements preferably of a positively engageable character, and an electrically controlled prime mover operator, illustrated as a solenoid, therefor. Energization of the solenoid is preferably controlled by a vehicle driver control herein illustrated as the accelerator pedal. The control further embodies means for momentarily interrupting the ignition circuit for the internal combustion engine whereby the driving torque to the change speed mechanism is momentarily interrupted to facilitate unloading of the torque between these drive control elements so as to accommodate their release.

Referring particularly to Figs. 16 and 24, a collar 205 is splined on the sun gear 192 and has an annular radially outwardly extending portion 206 provided with a plurality of circumferentially spaced slots or notches 207. The rear face of collar 205 abuts the adjacent end face of the sun gear teeth and is retained in position by a ring 208, as shown in Fig. 16. A retractible drive controlling element or pawl 209, slidably mounted intermediate a pair of fixed wear plates 210 and 211 extending through an opening 212 in the intermediate member 144 is adapted to engage a slot 207 for releasably holding the sun gear 192 against rotation. A split ring 213, preferably of spring steel, resiliently grips the outer periphery of the main body of collar 205 to be oscillated thereby as will be presently apparent. The ends of the ring 213 are circumferentially spaced to provide an opening adapted to register with the opening 212 in the part 144 for accommodating engagement of the pawl 209 in a notch 207. One end portion of ring 213 has a radially outwardly extending ear 214 disposed intermediate the plates 210 and 211 and which overlaps a portion of pawl 209 having a reduced thickness as indicated at 215 when the pawl is engaged in a slot for holding the sun gear against rotation. Oscillating movement of ring 213 is limited by engagement of ear 214 with the wear plates 210 and 211.

The pawl 209 is actuated by a rod 216 disposed in an opening 217 in a laterally extending portion 218 of the member 144. The rod 216 has a ball end portion 219 received in a correspondingly shaped socket 220 in pawl 209, the latter having a slot 221 communicating with socket 219 and receiving a portion of rod 216. This arrangement facilitates assembly of rod and pawl and prevents disengagement thereof when the rod is moved axially in retracting the pawl from a slot 207. The opening 217 is enlarged at 222 to accommodate retraction of the pawl.

The rod 216 projects outwardly beyond the portion 218 through an opening in a cover plate 223 fixed by screws 224 to the end face of enlarged portion 218. The wall defining the opening in plate 223 extends radially inwardly beyond the wall defining the opening 217 and provides an abutment for a washer 225. The latter provides an abutment for one end of a coil spring 226 surrounding rod 216, the other end of the spring abutting the pawl 209. The spring 226 yieldably urges the pawl to a position for engagement with a notch 207 and accommodates retraction of the pawl to a position of disengagement from a notch 207.

Operation of the holding means heretofore described for the sun gear of the planetary gearing is controlled by an electrically controlled prime mover motor herein illustrated as a solenoid and generally designated by the numeral 227. The solenoid is contained within a casing 228 having a lateral flange secured to the plate 223 by screws 229. Contained within the casing 228 is the usual solenoid coil 230 spaced from the plate 223 by the spacer 231 having a central opening accommodating the solenoid core 232. The latter has an opening 233 therein through which extends the pawl actuator rod 216 and within which is disposed a coil spring 234 surrounding the rod 216. One end of spring 234 abuts a washer 235 fixedly mounted on rod 216, the washer abutting the adjacent face of the radially inwardly extending portion of the end wall of core 232 which portion has an opening 236. The opposite end of spring 234 seats against an abutment 237 secured to the core 232. The relation of spring 226 to spring 234 is such that when the latter is compressed by movement of core 232 to the left, as indicated in Fig. 24, the built-up energy is sufficient to move the rod 216 and pawl 209 against resistance of spring 226 for retracting the pawl as will be presently apparent.

Carried by and movable with the solenoid core 232 is a metallic rod 238 having a portion thereof projecting axially beyond the adjacent end face of the core and extending into an opening 239 in the end face of casing 228. The rod 238 is adapted, upon movement of core 232 in response to energization of the solenoid, to engage a contact point on an oscillatable switch blade 240 included in the engine ignition system as hereafter set forth. The switch blade 240 is carried by an insulating mounting 241 secured by screw 242 to casing 228. An insulating leg 243 is carried by blade 240 and engages the end face of the casing 228, it being understood that the blade is yieldably urged to the position shown by suitable means such as a relatively light spring.

The end face of casing 228 has an opening 244 accommodating the free end of rod 216, the latter being provided with an electrically insulated extremity 245 engageable with the switch blade 240 for the purposes hereinafter set forth, it being understood that the rod 238 is adapted upon energization of the solenoid to engage the switch blade contact point prior to engagement of the insulated extremity 245 of pawl actuator rod 216 with the switch blade. As will be presently apparent, the rod 238 is moved to engage the contact point of switch blade 240 for momentarily interrupting the engine ignition circuit, while subsequent engagement of the insulated extremity 245 of rod 216 with the blade reestablishes the circuit. This solenoid core 232 and rod 238 constitute a leader part which, upon energization of the core, moves to interrupt the engine circuit, and during such movement the spring 234 is energized to actuate the rod 216 for releasing the pawl 209, the rod 216 constituting a follower which acts to restore the engine ignition circuit when the pawl 209 is released.

The switch 240 is included in the internal combustion engine ignition system or circuit which may be of any desired type and as herein illustrated includes the usual storage battery 246 having a connector 247 to the primary coil 248 and a return connector 249 in which is interposed a suitable switch, indicated at 250. The circuit also includes the secondary coil 251 connected with the movable member 252 of the distributor, generally indicated at 253, the latter having a series of stationary contacts connected by circuit wires to a respective spark plug of the internal combustion engine. One such connection is indicated at 254 for the insulated member of the spark plug 255, the opposing member of the spark plug being grounded in the engine as is also the coil 251, as indicated at 256. Connector 257 leads from the connector 247 to switch 240. The solenoid coil 230 is connected to the aforesaid circuit by circuit wire 258, the circuit to the solenoid being controlled through conductor 261 by the switch diagrammatically indicated at 259. The make and break switch indicated at 260 operates in timed relation with the movable member 252, viz., the contact is broken as the member engages a respective contact point and contact is made as the member 252 breaks contact with the aforesaid point.

The switch indicated at 259 is controlled by manipulation of a suitable vehicle driver operable member herein illustrated as the accelerator pedal 142 for the engine throttle control mechanism While the switch 259 may be arranged for operation in response to depression of the accelerator beyond its wide open throttle position for a throttle-overtravelling range of movement as disclosed in said Webb application, I have simplified the showing by arranging this switch for operation during the last few degrees of throttle opening movement. Thus in Fig. 1 the switch 259 is closed by full depression of the accelerator pedal but only during the final opening movement of the usual engine throttle valve.

In the operation of just the change speed ratio mechanism H let it be assumed that the sleeve K is shifted forwardly to the limit of its travel and that the holding means heretofore described for the sun gear 192 of the planetary gearing is in the position shown in Fig. 24 and the vehicle is operating at a speed to effect operation of the automatic clutch L to establish the overdrive as aforesaid and the vehicle operator desires to establish a slower speed ratio by means of the "kick-down" control. This is accomplished by fully depressing the accelerator pedal 142 to close the switch 259 whereupon the solenoid 227 is energized. Upon energization of the solenoid coil 230 the core 232 thereof is moved to the left as indicated in Fig. 24 and the extremity of pin 238 engages the contact point of switch blade 240 to ground the primary side of the ignition circuit thereby momentarily interrupting the latter. This interruption in turn produces a momentary reduction of the driving torque to shaft 49 accommodating withdrawal of the pawl 209 from a respective notch 207 by relieving the load between the drive control members 209 and 206.

As the solenoid core 232 is moved to the left as aforesaid, the spring 234 is compressed against fixed abutment 235, it being understood that the spring abutment 237 is moved with core 232. When the driving torque to shaft 49 is momentarily reduced through action of the pin 238 as aforesaid, the energy built up by compression of spring 234 snaps the pawl actuator rod 216 to the left as indicated in Fig. 24 thereby withdrawing the pawl 209 from a respective notch 207 against the resistance of spring 226. The insulated extremity 245 of rod 216 engages the switch blade 240 to move the latter away from the pin 238 for restoring the engine ignition circuit to normal operation and maintains this condition as long as switch 259 is closed and solenoid 227 is energized.

It will be understood that the foregoing operations occur within a relatively short period of time and that interruption of operation of engine F is only momentary.

Referring now to the blocker ring 213 and the operation thereof in connection with the "kickdown" control, it will be understood that the shaft 49 rotates in a clockwise direction, as indicated by the arrows in Figs. 22 and 23, when viewed from the front and such direction will be used throughout the following description. The Fig. 24 showing is viewed from the rear to better illustrate the relation of the parts and the direction of rotation of shaft 49 and its extension 145 being as indicated by the arrow.

When the holding means is in the position shown in Fig. 24, as aforesaid, the planet gears are being revolved in a clockwise direction by rotation of the carrier 187 by shaft 49, and rotate on a respective axis in a similar direction. The tendency therefore is for the sun gear 192 to rotate in clockwise direction and carry with it the blocker ring 213 due to the latter resiliently gripping the collar 205 of the sun gear. Where the pawl 209 is withdrawn from a slot 207 as aforesaid, the sun gear is free to rotate in response to its above tendency and the ring 213 is oscillated in a clockwise direction to move the radially extending ear against plate 210 to thereby prevent inward radial movement of the pawl 209 in response to action of spring 226. In this manner a slower speed ratio is established and continued during the time the accelerator pedal is maintained sufficiently depressed to close the solenoid control switch 259. During this operation the automatic clutch L remains operative and after release of the sun gear, the planet gears rotate on a respective axis in a counterclockwise direction and impart a clockwise direction of rotation to the sun gear.

When it is desired to re-establish the higher speed ratio or faster drive in mechanism H by returning the various parts to the position indicated in Fig. 24 whereby the sun gear 192 is again retained against rotation, the accelerator pedal is released from its fully depressed position to open switch 259 thereby de-energizing solenoid 227. While the spring 226 urges the pawl 209 radially inwardly to engage a slot 207, such engagement is prevented by the blocker ring 213 and can occur only by oscillation of the ring to a non-blocking position. This positioning of the ring results from rotation of the sun gear in a counter-clockwise direction. To accomplish the latter the accelerator pedal is moved to a position to decelerate the engine F whereby the driven annulus 191 is permitted, through operation of the clutch J to overrun the engine driven shaft 49; that is to say, the speed of the driven member 191 as well as that of the shaft 149 exceeds the speed of the driving shaft 49, and the driven annulus tends to drive the planet gears. This action is commonly referred to as "coasting" and when the transmission is so operating, the planet gears 189 are rotated in a clockwise direction, the sun gear being, of course, free for rotation, the direction thereof being counterclockwise. When the sun gear is so rotated it oscillates the ring 213 in a corresponding direction, the radially extending ear 214 engaging the plate 211 to limit movement. The ring 213 is thus positioned to permit the pawl 209 to engage a slot 207 under action of the spring 226.

It will be apparent that means readily accessible to the vehicle operator is provided for quickly establishing a slower speed drive through the kickdown control. The operation is preferably controlled by the accelerator pedal inasmuch as the latter is the means commonly operated to effect an immediate increase in power transmission. The electrically controlled prime mover operator, herein illustrated as a solenoid, is fully responsive to the control in effecting the momentary interruption of the engine ignition system for accommodating release of the holding means, and for automatically restoring the normal operation of the ignition system following the latter release.

I preferably transmit the drive from engine F to transmission A through a fluid coupling O (Fig. 5) and standard type releasable friction main clutch P although, if desired, the fluid coupling may be omitted. This coupling is preferably employed as it not only allows the car to come to a stop without requiring clutch P to be released, but also allows the engine to develop a more favorable torque at low car speed thereby allowing a faster drive ratio for the low range drive than would otherwise be practicable from the standpoint of performance.

The engine crankshaft 262 carries the vaned fluid coupling impeller 263 which in the well known manner drives the vaned runner 264 whence the drive passes through hub 265 to the clutch driving member 266. This member then transmits the drive, when clutch C is engaged as in Fig. 5, through driven member 267 to the transmission driving shaft 268 carrying the main drive pinion 40. A clutch pedal 269 (Fig. 1) controls clutch P such that when the driver depresses this pedal, collar 270 is thrust forward to cause levers 271 to release the clutch driving pressure plate 272 against springs 273 thereby releasing the drive between runner 264 and shaft 268. The primary function of main clutch P, when employed in conjunction with fluid coupling O, is to enable the driver to make certain manual shifts in transmission A especially for reverse and if for any reason the automatic system should fail. Of course, if a fluid coupling is not employed then some form of release mechanism, manual or automatic as is well known in the art, is desirable for the main clutch so that the car may be stopped in gear with the engine running as when stopping at a traffic light. Because of the automatic drive release at overrunning clutch J, which facilitates shifts of clutch sleeve C, it is not necessary to release clutch P during normal operation of the car when driving and stopping in traffic and on the road in general.

In the operation of the power transmission as a whole, the critical speed N of operation of governor B in opening switch G may be arranged as desired and the same is the case in connection with the critical speed M of operation of clutch L. As an example of an arrangement which I have found satisfactory in practice, the governor B may be arranged to open switch G at about 15 M. P. H. car speed in the low range drive through transmission A and direct drive through mechanism B. The clutch L is preferably set to become operative above the critical speed N of governor B, as about 25 M. P. H. car speed with the same drive at A and H. For convenience of understanding a typical arrangement of my invention, the following operation will be set forth using the assumed values of M and N.

With the car at standstill and with shift lever 30 in neutral and the engine off, the operator closes the ignition switch 140 and starts the engine in the usual way. If desired the usual hand parking brake of the car may be set during this engine starting or the wheel brakes operated because ordinarily the sleeve C will immediately shift to the low range when the engine is started and if the engine is raced the car may start ahead before the driver desires such start. Instead of braking the car, the driver may of course depress pedal 29 to release clutch P during starting of the engine. If the sleeve C does not itself move into the low range position then the driver releases clutch P and shifts lever 30 to the low range thereby clutching sleeve C with teeth 52. The position of lever 30 will at all times advise the driver of the position of sleeve C. Furthermore, when the ignition switch 140 is closed as aforesaid, solenoid E is energized because governor switch G is closed up to 15 M. P. H. car speed and chamber 106 is vented, the shift of sleeve C into the low range being directed by spring 108.

When sleeve C shifts rearwardly to its low range drive position of clutching with teeth 52, link 185 causes pin 184 to engage the forward end of slot 183 thereby imparting a slight rearward shifting movement to sleeve K of mechanism H thereby misaligning slots 181 from pawls 182 and rendering step-up at H inoperative until after step-up to the high range at A has been effected with resulting forward shift of sleeve K sufficient to allow pawls 182 to enter slots 181.

Clutch L is of course disengaged at car standstill and the car is started forwardly in the low range at A and in direct free-wheeling at H. This starting is effected by release of the brakes which may have been set and by depressing the accelerator pedal to speed up the engine, or by releasing clutch pedal 269 if the same was depressed and speeding up the engine.

The car is now accelerated in the low range at A and direct free-wheeling through overrunning clutch J at H. If the car is accelerated to a speed between N and M, governor B causes the governor switch G to open thereby opening chamber 106 to the intake vacuum and if at this time the driver releases the accelerator pedal the sleeve C will be shifted forwardly to clutch with teeth 41 for the high range or direct drive in transmission A. The act of releasing the accelerator pedal facilitates this step-up, the engine being automatically disconnected from the car driving ground wheels by reason of the overrunning clutch J so that the sleeve C may easily operate on the blocker synchronizer ring 56 in rapidly effecting the step-up drive at A. When sleeve C shifts to the high range, latch 112 engages shoulder 130 and holds piston 107 at position 107'' independently of vacuum conditions in the manifold 124 and chamber 106. Furthermore, after sleeve C has established preliminary engagement with teeth 41, then pin 184 acts at the rear end of slot 183 to cause sleeve K to shift forwardly from the Fig. 16 position sufficiently to preset the mechanism H in condition for operation for a step-up drive. Under the assumed conditions of coast from a drive in the low range to a car speed between M and N values, the step-up at H will not occur and only transmission A will respond to this coast for a step-up.

The car may then be further accelerated in high range at A and direct at H by depressing the accelerator pedal to cause the engine to drive the car. If the car speed then exceeds 25 M. P. H. or other predetermined value for M, the driver releases the accelerator pedal and when the speed of pawls 182 slows down to that of member 180 and shaft 149, clutch J overrunning, the pawls 182 will then engage the slots 181 for a step-up two-way drive at H. The step-up at H may be delayed as long as desired and the car accelerated in direct at H to any desired speed above the value M and driven at this speed so long as the accelerator pedal is not released to allow clutch L to operate at synchronization between the speeds of annulus gear 191 and shaft 149. When clutch L is engaged then the overrunning clutch J is thereby rendered inoperative and the car no longer will free-wheel, this condition being desirable for engine braking at speeds above M or 25 M. P. H. in the assumed conditions.

If the car is accelerated in the low range at A and direct at H to a speed above 25 M. P. H. before releasing the accelerator pedal, then when the accelerator pedal is released the sleeve C will step-up the drive to the high range at A followed immediately by step-up at H to overdrive. The step-up at H must follow the step-up at A because sleeve K is not moved to its position of unblocking relative to pawls 182 until after clutch C engages teeth 41 thereby insuring forward synchronizing shift of clutch C under conditions of release of shaft 49 from shaft 149 assisted by natural slowing down in the speed of engine F.

As the car slows down to a speed below 25 M. P. H., depending on coast or drive load conditions between pawls 182 and slots 181, the pawls 182 move inwardly thereby automatically effecting step-down at H in advance of step-down at A. This usually occurs at around 20 M. P. H. under the assumed conditions, lower if the load is excessive and higher if the load conditions are reversed at the pawls by changing from coast to drive or vice versa.

Further slowing down of the car below 15 M. P. H. to a speed, depending on the load imposed between teeth 41 and sleeve C, the governor B will operate to close governor switch G thereby energizing solenoid E and causing withdrawal of latch 112, venting of chamber 106, and operation of spring 108 to release sleeve C from the high range drive position and cause the sleeve to shift rearwardly to the low range position engaging teeth 52. This shift usually occurs just below 15 M. P. H or other value of N, because with the accelerator pedal released the engine can coast into the low range speed, clutch J is overrunning and shift of sleeve C is easily accommodated. In practice, with the illustrated arrangement, I have found that this downshift occurs around 8 to 10 M. P. H. Of course, if the car slows down below 15 M. P. H. while the engine is still imposing drive load to shaft 149 instead of coasting, then sleeve C will resist disengagement from teeth 41 for rearward shift by spring 108 and will remain engaged until a lower car speed has been reached. However, as soon as the accelerator pedal is released to unload the sleeve C then the shift will occur.

If the car speed is then further retarded so as to stop, the fluid coupling O allows the engine to idle, the sleeve C remaining in the low range position. Nothing further is necessary to accelerate the car again other than depressing the accelerator pedal.

In practically all instances of stopping the car and opening the ignition switch 140, as in parking the car, the sleeve C and shift lever 30 shift from low range to high range and then to a position of rest in neutral—sometimes in the low range. This is brought about because in shutting off the ignition when in the second range position of sleeve C, chamber 106 is opened to the intake manifold and the residual vacuum occasioned by the engine coming to rest causes sleeve C to shift to its high range position. Then, as this vacuum approaches atmospheric pressure, spring 108 shifts sleeve C toward the low range position. By this time the parts are practically at rest and blocker 63 generally prevents sleeve C from shifting beyond neutral until the engine starts to turn over as in starting the engine again. Of course, the driver may leave lever 30 in any desired shift position.

For reverse, the pedal 269 is ordinarily depressed to release the main clutch P, and lever 30 shifted to its reverse station thereby shifting gear 50 into mesh with reverse idler 51. The shift of reverse rail 82 acts through rod 166 to shift sleeve K rearwardly thereby engaging teeth 167 and 168 to lock out the overrunning clutch J. Spring 108 assists the shift from neutral to reverse. If the car is driven in reverse above 15 M. P. H. or the value of N then diaphragm 107 is subjected to vacuum in chamber 106. If now the driver depresses clutch pedal 269 and brings the car to rest, shifter 30 automatically moves to neutral and then to the low range position ready for a start forwardly. This is brought about because sleeve C is unloaded when clutch P is released whereupon vacuum at chamber 106 causes lever 30 to move rearwardly to pin 142' whereupon spring 90 causes 75 to release yoke 80 and engage yoke 81. By this time governor switch G is closed and lever 30 and sleeve C shift to their low range positions by spring 108.

It will be apparent that the fluid coupling O may be omitted as shifts of clutch sleeve C are made by free-wheeling at clutch J, the free-wheeling being automatically dispensed with at high speeds where sleeve C remains at its high range position. However, coupling O is desired for other reasons as aforesaid.

I claim:

1. In a drive for a motor vehicle having an engine; a driving shaft adapted to receive drive from the engine; a driven shaft adapted to receive drive at variable ratios from said driving shaft for driving the vehicle; an intermediate shaft coaxial with said driving and driven shafts and disposed therebetween; a first set of clutch teeth driven at 1 to 1 ratio with said driving shaft; a second set of clutch teeth; means for driving said second set of clutch teeth at reduced speed from said driving shaft; a shiftable clutch member drivingly connected to said intermediate shaft and adapted for selective shift in opposite directions for engagement with either said first or second sets of clutch teeth thereby to provide relatively fast or slow drives from said driving shaft to said intermediate shaft; blocking synchronizing means operable in response to shift of said shiftable clutch member toward said first set of clutch teeth to establish a synchronous relation between this clutch member and this set of teeth while blocking shift of this member into engagement with this set of teeth until establishment of said synchronous relation has occurred; blocking synchronizing means operable in response to shift of said shiftable clutch member toward said second set of clutch teeth to establish a synchronous relation between this clutch member and this set of teeth while blocking shift of this member into engagement set of teeth until establishment of said synchronous relation has occurred; powder applying means operable to effect power shift of said shiftable clutch member selectively toward each of said sets of clutch teeth; speed responsive controlling means operable in response to predetermined speed of one of said shafts for controlling shift of said shiftable clutch member by said power applying means; an overrunning clutch operable for transmitting one-way drive from said intermediate shaft to said driven shaft; overdrive means operable to establish a two-way drive between said intermediate and driven shafts by bridging said overrunning clutch thereby to drive said driven shaft from, and at a speed faster than that of, said intermediate shaft; control means for said overdrive means operable to selectively render said overdrive means either capable or incapable of establishing said two-way drive; and means for causing said control means to render said overdrive means incapable of establishing said two-way drive prior to engagement of said shiftable clutch member with said first set of clutch teeth whereby said overrunning clutch will operate to facilitate power clutching shift of said shiftable clutch member by disconnecting said intermediate shaft from said driven shaft in response to coast of said intermediate shaft.

2. In a drive for a motor vehicle having an engine; a driving shaft adapted to receive drive from the engine; a driven shaft adapted to receive drive at variable ratios from said driving shaft for driving the vehicle; an intermediate shaft coaxial with said driving and driven shafts and disposed therebetween; a first set of clutch teeth driven at 1 to 1 ratio with said driving shaft; a second set of clutch teeth; means for driving said second set of clutch teeth at reduced speed from said driving shaft; a shiftable clutch member drivingly connected to said intermediate shaft and adapted for selective shift in opposite directions for engagement with either said first or second sets of clutch teeth thereby to provide relatively fast or slow drives from said driving shaft to said intermediate shaft; blocking synchronizing means operable in response to shift of said shiftable clutch member toward said first set of clutch teeth to establish a synchronous relation between this clutch member and this set of teeth until establishment of said synchronous relation has occurred; blocking synchronizing means operable in response to shift of said shiftable clutch member toward said second set of clutch teeth to establish a synchronous relation between this clutch member and this set of teeth while blocking shift of this member into engagement set of teeth until establishment of said synchronous relation has occurred; power applying means operable to effect power shift of said shiftable clutch member selectively toward each of said sets of clutch teeth; speed responsive controlling means operable in response to predetermined speed of one of said shafts for controlling shift of said shiftable clutch member by said power applying means; an overrunning clutch operable for transmitting one-way drive from said intermediate shaft to said driven shaft; a speed responsive clutch comprising relatively engageable clutching structures; means for drivingly connecting said clutching structures to said intermediate and driven shafts respectively so as to provide, when said clutching structures are relatively engaged, a two-way drive between said intermediate and driven shafts by bridging said overrunning clutch thereby to drive said driven shaft from, and at a speed faster than that of, said intermediate shaft; means for shifting one of said clutching structures relative to the other between first and second positions thereof to selectively render said clutching structures either capable or incapable of relative engagement thereby to control operation of said two-way drive; and means for effecting shift of said shiftable clutching structure as a function of shift of said shiftable clutch member such that said shiftable clutching structure is shifted to its said second position in response to shift of said shiftable clutch member into engagement with said second set of clutch teeth, and such that said shiftable clutching structure is shifted from its said second position to its said first position as an incident to clutching shift of said shiftable clutch member toward said first set of clutch teeth, whereby said overrunning clutch will operate to facilitate power clutching shift of said shiftable clutch member by disconnecting said intermediate shaft from said driven shaft in response to coast of said intermediate shaft.

3. In a drive for a motor vehicle having an engine; a driving shaft adapted to receive drive from the engine; a driven shaft adapted to receive drive at variable ratios from said driving shaft for driving the vehicle; an intermediate shaft coaxial with said driving and driven shafts and disposed therebetween; a first set of clutch teeth driven at 1 to 1 ratio with said driving shaft; a second set of clutch teeth; means for driving said second set of clutch teeth at reduced speed from said driving shaft; a shiftable clutch member drivingly connected to said intermediate shaft and adapted for selective shift in opposite directions for engagement with either said first or second sets of clutch teeth thereby to provide relatively fast or slow drives from said driving shaft to said intermediate shaft; blocking synchronizing means operable in response to shift of said shiftable clutch member toward said first set of clutch teeth to establish a synchronous relation between this clutch member and this set of teeth while blocking shift of this member into engagement with this set of teeth until establishment of said synchronous relation has occurred; blocking synchronizing means operable in response to shift of said shiftable clutch member toward said second set of clutch teeth to establish a synchronous relation between this clutch member and this set of teeth while blocking shift of this member into engagement set of teeth until establishment of said synchronous relation has occurred; power applying means operable to effect power shift of said shiftable clutch member selectively toward each of said sets of clutch teeth; speed responsive controlling means operable in response to predetermined speed of one of said shafts for controlling shift of said shiftable clutch member by said power applying means; an overrunning clutch operable for transmitting one-way drive from said intermediate shaft to said driven shaft; a speed responsive clutch comprising relatively engageable clutching structures; means for drivingly connecting said clutching structures to said intermediate and driven shafts respectively so as to provide, when said clutching structures are relatively engaged, a two-way drive between said intermediate and driven shafts by bridging said overrunning clutch thereby to drive said driven shaft from, and at a speed faster than that of said intermediate shaft; means for shifting one of said clutching structures relative to the other between first and second positions thereof to selectively render said clutching structures either capable or incapable of relative engagement thereby to control operation of said two-way drive; and a lost motion connection between said shiftable clutch member and said shiftable clutching structure for effecting shift of said shiftable clutching structure as a function of shift of said shiftable clutch member such that said shiftable clutching structure is shifted to its said second position in response to clutching shift of said shiftable clutch member toward said second set of teeth, and such that said shiftable clutching structure is shifted from its said second position to its said first position subsequently to establishment of said synchronous relationship incident to shift of said shiftable clutch member toward the first said set of teeth, whereby said overrunning clutch will operate to facilitate power clutching shift of said shiftable clutch member by disconnecting said intermediate shaft from said driven shaft in response to coast of said intermediate shaft.

4. In a drive for a motor vehicle having an engine; a driving shaft adapted to receive drive from the engine; a driven shaft adapted to receive drive at variable ratios from said driving shaft for driving the vehicle; an intermediate shaft coaxial with said driving and driven shafts and disposed therebetween; a first set of clutch teeth driven at 1 to 1 ratio with said driving shaft; a second set of clutch teeth; means for driving said second set of clutch teeth at reduced speed from said driving shaft; a shiftable clutch member drivingly connected to said intermediate shaft and adapted for selective shift in opposite directions for engagement with either said first or second sets of clutch teeth thereby to provide relatively fast or slow drives from said driving shaft to said intermediate shaft; blocking synchronizing means operable in response to shift of said shiftable clutch member toward said first set of clutch teeth to establish a synchronous relation between this clutch member and this set of teeth while blocking shift of this member into engagement with this set of teeth until establishment of said synchronous relation has occurred; blocking synchronizing means operable in response to shift of said shiftable clutch member toward said second set of clutch teeth to establish a synchronous relation between this clutch member and this set of teeth while blocking shift of this member into engagement set of teeth until establishment of said synchronous relation has occurred; means biasing shift of said shiftable clutch member in one of said directions for effecting engagement thereof with said second set of clutch teeth; prime mover means operable to effect shift of said shiftable clutch member in the other of its said directions for effecting engagement thereof with said first set of teeth; speed responsive means operable in response to acceleration of the vehicle from rest to a predetermined speed in said slow drive for rendering said prime mover means operable to urge shift of said shiftable clutch member toward said first set of teeth, said speed responsive means operating in response to retardation of the vehicle to a predetermined speed in said fast drive for rendering said prime mover means inoperative thereby causing said biasing means to urge shift of said shiftable clutch member toward said second set of teeth; an overrunning clutch operable for transmitting one-way drive from said intermediate shaft to said driven shaft, said overrunning clutch operating automatically to release said intermediate shaft from said driven shaft in response to engine coast thereby facilitating clutching of said shiftable clutch member by said biasing means and said prime mover means; over-drive means operable to establish a two-way drive between said intermediate and driven shafts by bridging said overrunning clutch thereby to drive said driven shaft from, and at a speed faster than that of, said intermediate shaft; speed responsive drive-control means operable in response to predetermined speed of the vehicle, when driven in said slow drive and through said overrunning clutch, for rendering said two-way drive operative; and means controlling operation of said speed responsive drive-control means as a function of shift of said shiftable clutch member such that establishment of said two-way drive is limited to shift of said clutch member into engagement with said first set of clutch teeth.

5. In a drive for a motor vehicle having an engine; a driving shaft adapted to receive drive from the engine; a driven shaft adapted to receive drive at variable ratios from said driving shaft for driving the vehicle; an intermediate shaft coaxial with said driving and driven shafts and disposed therebetween; a first set of clutch teeth driven at 1 to 1 ratio with said driving shaft; a second set of clutch teeth; means for driving said second set of clutch teeth at reduced speed from said driving shaft; a shiftable clutch member drivingly connected to said intermediate shaft and adapted for selective shift in opposite directions for engagement with either said first or second sets of clutch teeth thereby to provide relatively fast or slow drives from said driving shaft to said intermediate shaft; blocking synchronizing means operable in response to shift of said shiftable clutch member toward said first set of clutch teeth to establish a synchronous relation between this clutch member and this set of teeth while blocking shift of this member into engagement with this set of teeth until establishment of said synchronous relation has occurred; blocking synchronizing means operable in response to shift of said shiftable clutch member toward said second set of clutch teeth to establish a synchronous relation between this clutch member and this set of teeth while blocking shift of this member into engagement set of teeth until establishment of said synchronous relation has occurred; means biasing shift of said shiftable clutch member in one of said directions for effecting engagement thereof with said second set of clutch teeth; prime mover means operable to effect shift of said shiftable clutch member in the other of its said directions for effecting engagement thereof with said first set of teeth; speed responsive means operable in response to acceleration of the vehicle from rest to a predetermined speed in said slow drive for rendering said prime mover means operable to urge shift of said shiftable clutch member toward said first set of teeth, said speed responsive means operating in response to retardation of the vehicle to a predetermined speed in said fast drive for rendering said prime mover means inoperative thereby causing said biasing means to urge shift of said shiftable clutch member toward said second set of teeth; an overrunning clutch operable for transmitting one-way drive from said intermediate shaft to said driven shaft, said overrunning clutch operating automatically to release said intermediate shaft from said driven shaft in response to engine coast thereby facilitating clutching of said shiftable clutch member by said biasing means and said prime mover means; a speed responsive clutch comprising relatively engageable clutching structures; means for drivingly connecting said clutching structures to said intermediate and driven shafts respectively so as to provide, when said clutching structures are relatively engaged, a two-way drive between said intermediate and driven shafts by bridging said overrunning clutch thereby to drive said driven shaft from, and at a speed faster than that of, said intermediate shaft; means for shifting one of said clutching structures relative to the other between first and second positions thereof to selectively render said clutching structures either capable or incapable of relative engagement thereby to control operation of said two-way drive; and means for effecting shift of said shiftable clutching structure as a function of shift of said shiftable clutch member such that said shiftable clutching structure is shifted to its said second position in response to shift of said shiftable clutch member into engagement with said second set of clutch teeth, and such that said shiftable clutching structure is shifted from its said second position to its said first position as an incident to clutching shift of said shiftable clutch member toward said first set of clutch teeth, whereby said overrunning clutch will operate to facilitate shift of said shiftable clutch member by disconnecting said intermediate shaft from said driven shaft in response to engine coast.

6. In a drive for a motor vehicle having an engine; a driving shaft adapted to receive drive from the engine; a driven shaft adapted to receive drive at variable ratios from said driving shaft for driving the vehicle; an intermediate shaft coaxial with said driving and driven shafts and disposed therebetween; a first set of clutch teeth driven at 1 to 1 ratio with said driving shaft; a second set of clutch teeth; means for driving said second set of clutch teeth at reduced speed from said driving shaft; a shiftable clutch member drivingly connected to said intermediate shaft and adapted for selective shift in opposite directions for engagement with either said first or second sets of clutch teeth thereby to provide relatively fast or slow drives from said driving shaft to said intermediate shaft; blocking synchronizing means operable in response to shift of said shiftable clutch member toward said first set of clutch teeth to establish a synchronous relation between this clutch member and this set of teeth while blocking shift of this member into engagement with this set of teeth until establishment of said synchronous relation has occurred; blocking synchronizing means operable in response to shift of said shiftable clutch member toward said second set of clutch teeth to establish a synchronous relation between this clutch member and this set of teeth while blocking shift of this member into engagement set of teeth until establishment of said synchronous relation has occurred; means biasing shift of said shiftable clutch member in one of said directions for effecting engagement thereof with said second set of clutch teeth; prime mover means operable to effect shift of said shiftable clutch member in the other of its said directions for effecting engagement thereof with said first set of teeth; speed responsive means operable in response to acceleration of the vehicle from rest to a predetermined speed in said slow drive for rendering said prime mover means operable to urge shift of said shiftable clutch member toward said first set of teeth, said speed responsive means operating in response to retardation of the vehicle to a predetermined speed in said fast drive for rendering said prime mover means inoperative thereby causing said biasing means to urge shift of said shiftable clutch member toward said second set of teeth; an overrunning clutch operable for transmitting one-way drive from said intermediate shaft to said driven shaft, said overrunning clutch operating automatically to release said intermediate shaft from said driven shaft in response to engine coast thereby facilitating clutching of said shiftable clutch member by said biasing means and said prime mover means; a speed responsive clutch comprising relatively engageable clutching structures; means for drivingly connecting said clutching structures to said intermediate and driven shafts respectively so as to provide, when said clutching structures are relatively engaged, a two-way drive between said intermediate and driven shafts by bridging said overrunning clutch thereby to drive said driven shaft from, and at a speed faster than that of, said intermediate shaft; means for shifting one of said clutching structures relative to the other between first and second positions thereof to selectively render said clutching structures either capable or incapable of relative engagement thereby to control operation of said two-way drive; and a lost motion connection between said shiftable clutch member and said shiftable clutching structure for effecting shift of said shiftable clutching structure as a function of shift of said shiftable clutch member such that said shiftable clutching structure is shifted to its said second position in response to clutching shift of said shiftable clutch member toward said second set of teeth, and such that said shiftable clutching structure is shifted from its said second position to its said first position subsequently to establishment of said synchronous relationship incident to shift of said shiftable clutch member toward the first said set of teeth, whereby said overrunning clutch will operate to facilitate shift of said shiftable clutch member by disconnecting said intermediate shaft from said driven shaft in response to engine coast.

7. In a drive for a motor vehicle according to claim 1; a drive control lever adapted for shift by the vehicle driver; means operably connecting said lever with said shiftable clutch member such that shift of this clutch member selectively toward each of said sets of clutch teeth by said power means, will operate to shift said lever independently of driver shift thereof.

8. In a drive for a motor vehicle according to claim 2; said shiftable clutching structure being adapted for shift to a third position thereof for coupling said intermediate and driven shafts for a two-way direct drive; means operable to drive the intermediate shaft reversely relative to said driving shaft; means operable under control of the vehicle driver for establishing operation of said reverse drive means; and means operating as an incident to establishing operation of said reverse drive means for shifting said shiftable clutching structure to its said third position.

9. In a drive for a motor vehicle according to claim 2; said shiftable clutching structure being adapted for shift to a third position thereof for coupling said intermediate and driven shafts for a two-way direct drive; means operable under control of the vehicle driver for establishing reverse drive relation between said driving and intermediate shafts; a drive control lever adapted for shift by the vehicle driver; means operably connecting said lever with said shiftable clutch member such that shift of this clutch member selectively toward each of said sets of clutch teeth by said power means will operate to shift said lever independently of driver shift thereof; means operable in response to driver shift of said lever for establishing said reverse drive relation; and means operating as an incident to establishing said reverse drive relation for effecting shift of said shiftable clutching structure to its said third position.

10. In a drive for a motor vehicle according to claim 3; a drive control lever adapted for shift by the vehicle driver; means operably connecting said lever with said shiftable clutch member such that shift of this clutch member selectively toward each of said sets of clutch teeth by said power means will operate to shift said lever independently of driver shift thereof.

11. In a drive for a motor vehicle according to claim 3; said shiftable clutching structure being adapted for shift to a third position thereof for coupling said intermediate and driven shafts for a two-way direct drive; means operable to drive the intermediate shaft reversely relative to said driving shaft; means operable under control of the vehicle driver for establishing operation of said reverse drive means; and means operating as an incident to establishing operation of said reverse drive means for shifting said shiftable clutching structure to its said third position independently of said lost motion connection.

12. In a drive for a motor vehicle according to claim 3; said shiftable clutching structure being adapted for shift to a third position thereof for coupling said intermediate and driven shafts for a two-way direct drive; means operable under control of the vehicle driver for establishing reverse drive relation between said driving and intermediate shafts; a drive control lever adapted for shift by the vehicle driver; means operably connecting said lever with said shiftable clutch member such that shift of this clutch member selectively toward each of said sets of clutch teeth by said power means will operate to shift said lever independently of driver shift thereof; means operable in response to driver shift of said lever for establishing said reverse drive relation; and means operating as an incident to establishing said reverse drive relation for effecting shift of said shiftable clutching structure to its said third position.

13. In a drive for a motor vehicle according to claim 4; said prime mover means comprising a pressure differential operated piston operably connected to said shiftable clutch member; said biasing means comprising a spring opposing pressure differential operation of said piston.

14. In a motor vehicle drive according to claim 2; an accelerator pedal operable to adjust the engine throttle; and means operable in response to operation of said accelerator pedal in throttle opening direction for effecting release of said two-way drive without disengaging said clutching structures.

15. In a drive for a motor vehicle having an engine; a driving shaft adapted to receive drive from the engine; a driven shaft adapted to drive the vehicle; an intermediate shaft coaxial with said driving and driven shafts and disposed therebetween; drive transmitting means operable to provide a drive from said driving shaft to said intermediate shaft, comprising, positively engageable drive-control elements one of which is movable into engaging relation with the other to accommodate said drive and into disengaging relationship with respect to said other element to release said drive; speed controlled power shifting means operating to bias said movable drive-control element for power shift into said engaging relation; means blocking power shift movement of said movable drive-control element into said engaging relation until the speeds of said elements are synchronous; drive transmitting means operable to provide a drive from said intermediate shaft to said driven shaft, comprising, positively engageable drive-control members one of which is movable into engaging relation with the other to accommodate this drive and into disengaging relationship with respect to said other member to release this drive; and means operating to control movement of said movable drive-control member into its said engaging relation as a function of power shift movement of said movable drive-control element into its said engaging relation such that one of said drives must be established prior to establishment of the other of said drives.

16. In a drive for a motor vehicle having an engine; a driving shaft adapted to receive drive from the engine; a driven shaft adapted to drive the vehicle; an intermediate shaft coaxial with said driving and driven shafts and disposed therebetween; drive transmitting means operable to provide a drive from said driving shaft to said intermediate shaft, comprising, positively engageable drive-control elements one of which is movable into engaging relation with the other to accommodate said drive and into disengaging relationship with respect to said other element to release said drive; speed controlled power shifting means operating to bias said movable drive-control element for power shift into said engaging relation; means blocking power shift movement of said movable drive-control element into said engaging relation until the speeds of said elements are synchronous; drive transmitting means operable to provide a drive from said intermediate shaft to said driven shaft, comprising, positively engageable drive-control members one of which is movable into engaging relation with the other to accommodate this drive and into disengaging relationship with respect to said other member to release this drive; and means operating to prevent movement of said movable drive-control member into its said engaging relation prior to power shift movement of said movable drive-control element into its said engaging relation such that the first said drive must be established prior to establishment of the second said drive.

17. In a drive for a motor vehicle according to claim 15; means operable in response to predetermined speed of one of said shafts for biasing movement of said movable drive-control element into its said engaging relation.

18. In a drive for a motor vehicle having an engine; a driving shaft adapted to receive drive from the engine; a driven shaft adapted to receive drive at variable ratios from said driving shaft for driving the vehicle; an intermediate shaft coaxial with said driving and driven shafts and disposed therebetween; a first set of clutch teeth driven at 1 to 1 ratio with said driving shaft; a second set of clutch teeth; means for driving said second set of clutch teeth at reduced speed from said driving shaft; a shiftable clutch member drivingly connected to said intermediate shaft and adapted for selective shift in opposite directions for engagement with either said first or second sets of clutch teeth thereby to provide relatively fast or slow drives from said driving shaft to said intermediate shaft; blocking synchronizing means operable in response to shift of said shiftable clutch member toward said first set of clutch teeth to establish a synchronous relation between this clutch member and this set of teeth while blocking shift of this member into engagement with this set of teeth until establishment of said synchronous relation has occurred; blocking synchronizing means operable in response to shift of said shiftable clutch member toward said second set of clutch teeth to establish a synchronous relation between this clutch member and this set of teeth while blocking shift of this member into engagement set of teeth until establishment of said synchronous relation has occurred; means for shifting said shiftable clutch member selectively toward said sets of clutch teeth; means operable to drive said intermediate shaft reversely from said driving shaft; means operable under control of the vehicle driver for establishing operation of said reverse drive means; an overrunning clutch operable for transmitting one-way drive from said intermediate shaft to said driven shaft; a pair of relatively engageable clutching structures, one of which is operable by centrifugal force acting thereon to clutch with the other; overdrive means for connecting said driven shaft with said intermediate shaft around said overrunning clutch and through said clutching structures; means for shifting one of said clutching structures into an inoperative relation with respect to the other clutching structure in response to engagement of said shiftable clutch member with said second set of clutch teeth and into an operative relation with respect to said other clutching structure in response to engagement of said shiftable clutch member with said first set of clutch teeth; and means operating to clutch said intermediate and driven shafts together for a two-way direct drive therebetween in response to establishing said reverse drive.

19. In a drive for a motor vehicle having an engine; a driving shaft adapted to receive drive from the engine; a driven shaft adapted to drive the vehicle; a plurality of torque transmitting speed ratio driving means providing relatively different drives from said driving shaft to said driven shaft; one of said speed ratio driving means comprising, a pair of positively engageable drive control elements adapted for relative engagement and disengagement to control operation of one of said drives, speed controlled power shifting means operable to effect said relative engagement and disengagement of said drive control elements, and means limiting relative engagement of said drive control elements to an approximately synchronous relationship therebetween during coast of said driving shaft; another of said speed ratio driving means comprising a pair of positively engageable drive control members adapted for relative engagement and disengagement to control operation of another of said drives, and means limiting relative engagement of said drive control members to an approximately synchronous relationship therebetween during coast of said driving shaft; and means automatically controlling engagement of said drive control elements as a function of engagement of said drive control members such that engagement of said drive control elements by said speed controlled power shifting means cannot take place until said drive control members are relatively engaged.

20. In a drive for a motor vehicle having an engine; a driving shaft adapted to receive drive from the engine; a driven shaft adapted to drive the vehicle; a plurality of torque transmitting speed ratio driving means providing relatively different drives from said driving shaft to said driven shaft, one of said speed ratio driving means comprising, a pair of positively engageable drive control elements adapted for relative engagement and disengagement to control operation of one of said drives, and means limiting relative engagement of said drive control elements to an approximately synchronous relationship therebetween during coast of said driving shaft; another of said speed ratio driving means comprising a pair of positively engageable drive control members adapted for relative engagement and disengagement to control operation of another of said drives, and means limiting relative engagement of said drive control members to an approximately synchronous relationship therebetween during coast of said driving shaft; and means operating to shift one of said drive control members relative to the other between positions permitting and preventing their relative engagement as a function of relative engagement and disengagement of said drive control elements.

21. In a drive for a motor vehicle having an engine; a driving shaft adapted to receive drive from the engine; a driven shaft adapted to drive the vehicle; a plurality of torque transmitting speed ratio driving means providing relatively different drives from said driving shaft to said driven shaft, one of said speed ratio driving means comprising, a pair of positively engageable drive control elements adapted for relative engagement and disengagement to control operation of one of said drives, and means limiting relative engagement of said drive control elements to an approximately synchronous relationship therebetween during coast of said driving shaft; another of said speed ratio driving means comprising a pair of positively engageable drive control members adapted for relative engagement and disengagement to control operation of another of said drives, and means limiting relative engagement of said drive control members to an approximately synchronous relationship therebetween during coast of said driving shaft; another of said speed ratio driving means comprising, a third drive control member cooperably associated with one of said pair of drive control members for relative engagement and disengagement thereof to control operation of another of said drives, and means limiting relative engagement of said one and said third drive control members to an approximately synchronous relationship therebetween; means operable in response to predetermined speeds of one of said shafts for biasing said one drive control member selectively toward the other of said pair of members and said third member; and means automatically controlling engagement of said drive control elements as a function of engagement of said one drive control member with the other of said pair of members and with said third member such that engagement of said drive control elements is permitted to take place subsequently to engagement of said pair of drive control members but prevented from taking place when said one drive control member is engaged with said third member.

22. In a drive for a motor vehicle having an engine; a driving shaft adapted to receive drive from the engine; a driven shaft adapted to drive the vehicle; a plurality of torque transmitting speed ratio driving means providing relatively different drives from said driving shaft to said driven shaft; one of said speed ratio driving means comprising, a pair of positively engageable drive control elements adapted for relative engagement and disengagement to control operation of one of said drives, and means limiting relative engagement of said drive control elements to an approximately synchronous relationship therebetween during coast of said driving shaft; another of said speed ratio driving means comprising, a pair of positively engageable drive control members one of which is movable back and forth with respect to the other for engagement and disengagement with respect thereto to control operation of another of said drives, speed controlled power shifting means operable to effect said movements of said one drive control member, means operating as an incident to power shift movement of said movable drive control member toward said other member for effecting synchronous relation therebetween, and means limiting relative engagement of said pair of drive control members to said synchronous relation; and means automatically controlling engagement of said drive control elements as a function engagement of said drive control members such that engagement of said elements cannot take place until said members are relatively engaged.

23. In a drive for a motor vehicle having an engine; a driving shaft adapted to receive drive from the engine; a driven shaft adapted to drive the vehicle; a plurality of torque transmitting speed ratio driving means providing relatively different drives from said driving shaft to said driven shaft; one of said speed ratio driving means comprising, a pair of positively engageable drive control elements adapted for relative engagement and disengagement to control operation of one of said drives, and means limiting relative engagement of said drive control elements to an approximately synchronous relationship therebetween during coast of said driving shaft; another of said speed ratio driving means comprising, a pair of positively engageable drive control members one of which is movable with respect to the other for engagement and disengagement with respect thereto to control operation of another of said drives, means operating as an incident to movement of said movable drive control member toward said other member for effecting synchronous relation therebetween, and means limiting relative engagement of said pair of drive control members to said synchronous relation; another of said speed ratio driving means comprising, a third drive control member adapted for positive engagement by said movable member to establish operation of another of said drives, means operating as an incident to movement of said movable member toward said third member for effecting synchronous relation therebetween, and means limiting relative engagement of said movable and third members to said synchronous relation; means operable in response to predetermined speeds of one of said shafts for biasing movement of said movable member selectively toward said other and third members; and means automatically controlling engagement of said elements as a function of engagement of said movable member with said other and third members such that engagement of said elements is permitted to take place subsequently to engagement of said pair of members but prevented from taking place when said movable member is engaged with said third member.

24. In a motor vehicle drive; coaxial driving, intermediate, and driven shafts; a shiftable clutching device adapted for drive connection to said intermediate shaft; a pair of torque transmitting members adapted to be driven at relatively different speeds from said driving shaft; blocker synchronizing means between said device and members for controlling selective engagement of said device with said members; overrunning clutch means operably connecting said shafts; a pair of drive control elements one movable in a plane generally transversely of the axis of said shafts for positive engagement with the other, one of said elements being displaceable in the general direction of said axis from a first position accommodating said engagement to a second position preventing said engagement; means operating to drivingly connect said intermediate and driven shafts for a two-way drive therebetween when said elements are relatively engaged; and means acting to effect displacement of said displaceable element to its said second position as an incident to engagement of said device with one of said members, and to effect displacement of said displaceable element to its said first position as an incident to engagement of said device with the other of said members.

25. In a motor vehicle drive according to claim 24; means operating automatically to bias said device selectively toward said members at speeds proportionate to one of said shafts.

26. In a motor vehicle drive according to claim 24; means operating automatically to bias said device selectively toward said members at speeds proportionate to one of said shafts; and means operating to prevent relative engagement of said elements prior to attainment of a predetermined speed of at least one of said shafts.

27. In a motor vehicle drive according to claim 24; means operating automatically to bias said device selectively toward said members at speeds proportionate to one of said shafts; and a driver-operable selector lever operably connected to said device for automatic shifting thereof in response to shift of said device by said biasing means.

28. In a drive for a motor vehicle having an engine; a driving shaft adapted to receive drive from the engine; a driven shaft adapted to receive drive at variable ratios from said driving shaft for driving the vehicle; an intermediate shaft coaxial with said driving and driven shafts and disposed therebetween; a set of clutch teeth driven at 1 to 1 ratio with said driving shaft; a toothed clutch member adapted for driving connection with said intermediate shaft and shiftable relative thereto to clutch with said set of clutch teeth thereby to provide step-up direct drive between said driving and intermediate shafts; blocking means operable to prevent said clutching of said clutch member with said set of clutch teeth until establishment of synchronous relationship of the speeds of said driving and intermediate shafts, said engine having an accelerator pedal for controlling its intake such that release of this pedal causes the engine to impose a retarding force on said driving shaft thereby expediting the attainment of said synchronous relationship; means providing a torque-multiplying vehicle starting drive from said driving shaft to said intermediate shaft so constructed and arranged as to accommodate said step-up direct drive when the driver releases the accelerator pedal at or above a predetermined speed proportionate to the speed of rotation of said intermediate shaft; means biasing shift of said clutch member in one direction for effecting disengagement thereof with respect to said set of clutch teeth; means, including a power motor, for effecting clutching shift of said clutch member in the opposite direction thereby to establish its said clutching relationship; speed responsive means operable in response to attaining said predetermined speed for controlling said clutching shift means such that said clutching member is shifted in said opposite direction to effect its said clutching when the accelerator pedal is released, said speed responsive means operating on bringing the vehicle to rest to render said clutching shift means inoperative thereby accommodating shift of said clutch member in said one direction by said biasing means; overrunning clutch means operable for transmitting a one-way vehicle starting drive of 1 to 1 ratio from said intermediate shaft to said driven shaft; overdrive means operable, at or above a predetermined vehicle speed and upon release of the accelerator pedal, to establish a two-way step-up drive between said intermediate and driven shafts by bridging said overrunning clutch means thereby to drive said driven shaft from, and at a speed faster than that of, said intermediate shaft; speed responsive drive-control means operable in response to the vehicle attaining a predetermined speed for rendering said two-way drive means operable, said speed responsive drive-control means operating on bringing the vehicle to rest to render said two-way drive inoperative; said speed responsive means and said speed responsive drive-control means being so relatively arranged that when the vehicle is accelerated from rest through said starting drives to the minimum speed for accommodating operation of said step-up direct drive then, on release of the accelerator pedal, said speed responsive drive-control means will maintain said two-way step-up drive means inoperative, and such that when the vehicle is accelerated from rest through said starting drives to the minimum speed for accommodating operation of said two-way step-up drive means then, on release of the accelerator pedal, said step-up drives will be established in predetermined order of sequence; and means operating to cause said predetermined sequential establishment of said step-up drives as aforesaid.

29. In a motor vehicle drive according to claim 28; said power motor comprising a pressure differential operated piston utilizing vacuum of the engine intake for effecting its operation; said biasing means comprising a spring opposing pressure differential operation of said piston.

30. In a motor vehicle drive according to claim 28; and means operating in response to full depression of the accelerator pedal, during vehicle drive through said step-up two-way drive, for effecting release of that step-up drive which was established last in said sequential order as aforesaid.

31. In a drive for a motor vehicle having an engine; a driving shaft adapted to receive drive from the engine; a driven shaft adapted to receive drive at variable ratios from said driving shaft for driving the vehicle; an intermediate shaft coaxial with said driving and driven shafts and disposed therebetween; said engine having a throttle-controlling accelerator pedal releasable to cause the engine to impose retarding force on said driving shaft; means providing a relatively slow drive from said driving shaft to said intermediate shaft; means, including positively engageable drive-control elements, operable in response to release of said accelerator pedal for providing step-up relatively fast drive from said driving shaft to said intermediate shaft; means providing a relatively slow drive from said intermediate shaft to said driven shaft; means, including positively engageable drive-control members, operable in response to release of said accelerator pedal for providing step-up relatively fast drive from said intermediate shaft to said driven shaft; means operable in response to speed of travel of the vehicle in accelerating the vehicle from rest through said relatively slow drives for limiting operation of each of said step-up drives until the vehicle has attained predetermined speeds relatively different for each of said drives; and change speed control means compelling establishment of said step-up drives in predetermined order of sequence when, after the vehicle has been accelerated from rest through said relatively slow drives to a vehicle speed accommodating operation of both of said step-up drives, the accelerator pedal is released.

32. In a motor vehicle drive according to claim 31; and means operating in response to full depression of the accelerator pedal, during vehicle drive through said step-up drives, for effecting release of that step-up drive which was established last in said sequential order as aforesaid.

33. In a drive for a motor vehicle having an engine; a driving shaft adapted to receive drive from the engine; a driven shaft adapted to drive the vehicle; a plurality of torque transmitting speed ratio driving means providing relatively different drives from said driving shaft to said driven shaft, one of said speed ratio driving means comprising, a pair of positively engageable drive control elements adapted for relative engagement and disengagement to control operation of one of said drives, and means limiting relative engagement of said drive control elements to an approximately synchronous relationship therebetween during coast of said driving shaft; another of said speed ratio driving means comprising a pair of positively engageable drive control members adapted for relative engagement and disengagement to control operation of another of said drives, and means limiting relative engagement of said drive control members to an approximately synchronous relationship therebetween during coast of said driving shaft; another of said speed ratio driving means comprising, a third drive control member cooperably associated with one of said pair of drive control members for relative engagement and disengagement thereof to control operation of another of said drives, and means limiting relative engagement of said one and said third drive control members to an approximately synchronous relationship therebetween; means automatically controlling engagement of said drive control elements as a function of engagement of said one drive control member with the other of said pair of members and with said third member such that engagement of said drive control elements is permitted to take place subsequently to engagement of said pair of drive control members but prevented from taking place when said one drive control member is engaged with said third member; power means operating automatically to bias said one drive control member selectively toward the other of said pair of members and toward said third member at speeds proportionate to one of said shafts; and a driver-operable selector lever operably connected to said one drive control member for automatic shifting of said lever in response to selective engagement of said one member by said biasing means with the other of said pair of members and with said third member.

34. In a drive for a motor vehicle having an engine; a driving shaft adapted to receive drive from the engine; a driven shaft adapted to drive the vehicle; a plurality of torque transmitting speed ratio driving means providing relatively different drives from said driving shaft to said driven shaft; one of said speed ratio driving means comprising, a pair of positively engageable drive control elements adapted for relative engagement and disengagement to control operation of one of said drives, and means limiting relative engagement of said drive control elements to an approximately synchronous relationship therebetween during coast of said driving shaft; another of said speed ratio driving means comprising a pair of positively engageable drive control members adapted for relative engagement and disengagement to control operation of another of said drives, and means limiting relative engagement of said drive control members to an approximately synchronous relationship therebetween during coast of said driving shaft; means automatically controlling engagement of said drive control elements as a function of engagement of said drive control members such that engagement of said drive control elements cannot take place until said drive control members are relatively engaged; means limiting said relative engagement of said drive control elements to rotation of at least one of said shafts at or above a predetermined speed; and means limiting said relative engagement of said drive control members to rotation of at least one of said shafts at or above a predetermined speed.

EDWARD H. PRIEBE.